(12) United States Patent
Ragner

(10) Patent No.: US 9,239,121 B1
(45) Date of Patent: Jan. 19, 2016

(54) VALLEY SHAPING REINFORCEMENT

(75) Inventor: Gary Dean Ragner, Gainesville, FL (US)

(73) Assignee: Ragner Technology Corporation, Gainesville, FL (US)

(*) Notice: Subject to any disclaimer, the term of this patent is extended or adjusted under 35 U.S.C. 154(b) by 593 days.

(21) Appl. No.: 13/447,273

(22) Filed: Apr. 15, 2012

Related U.S. Application Data

(60) Provisional application No. 61/517,244, filed on Apr. 15, 2011, provisional application No. 61/607,365, filed on Mar. 6, 2012.

(51) Int. Cl.
*F16L 11/00* (2006.01)
*F16L 9/14* (2006.01)

(52) U.S. Cl.
CPC ... *F16L 11/00* (2013.01); *F16L 9/14* (2013.01)

(58) Field of Classification Search
CPC .................................. F16L 11/00; F16L 9/14
USPC ................ 138/122–125, 129–130, 137, 144, 138/118–119
See application file for complete search history.

(56) References Cited

U.S. PATENT DOCUMENTS

| | | | |
|---|---|---|---|
| 3,076,737 A | 2/1963 | Roberts | |
| 3,117,596 A | 1/1964 | Mahn | |
| 3,194,705 A | 7/1965 | Caplan | |
| 4,048,362 A * | 9/1977 | Moring et al. | 428/36.7 |
| 4,053,275 A * | 10/1977 | Kramer et al. | 425/389 |
| 4,104,095 A * | 8/1978 | Shaw | 156/83 |
| 4,113,828 A | 9/1978 | Kramer | |
| 4,295,496 A * | 10/1981 | Bixby | 138/122 |
| 4,308,895 A * | 1/1982 | Greco | 138/125 |
| 4,360,493 A * | 11/1982 | Kramer et al. | 264/506 |
| 4,445,543 A * | 5/1984 | Mead | 138/122 |
| 4,633,912 A * | 1/1987 | Pilkington et al. | 138/132 |
| 4,674,543 A * | 6/1987 | Ziemek et al. | 138/153 |
| 6,024,134 A * | 2/2000 | Akedo et al. | 138/129 |
| 6,158,477 A * | 12/2000 | Waters | 138/129 |
| 6,948,527 B2 | 9/2005 | Ragner | |
| 7,549,448 B2 * | 6/2009 | Ragner | 138/119 |
| 8,418,729 B2 * | 4/2013 | Martucci et al. | 138/121 |
| 2006/0095018 A1 * | 5/2006 | Pursley | 604/526 |

* cited by examiner

*Primary Examiner* — Paul R Durand
*Assistant Examiner* — Andrew P Bainbridge
(74) *Attorney, Agent, or Firm* — Frost Brown Todd LLC

(57) ABSTRACT

A valley shaping means for bidirectionally reinforced convoluted hoses comprising high strength fibers and/or cords which is designed for bonding and/or integration into the valley portion of the bidirectionally reinforced convoluted hose. The high-strength fibers and/or cords can be pre-coated prior to integration with the bidirectionally reinforced convoluted hose, or be coated and bonded after placed in position at the bottom of the valley portion of the bidirectionally reinforced convoluted hose.

15 Claims, 9 Drawing Sheets

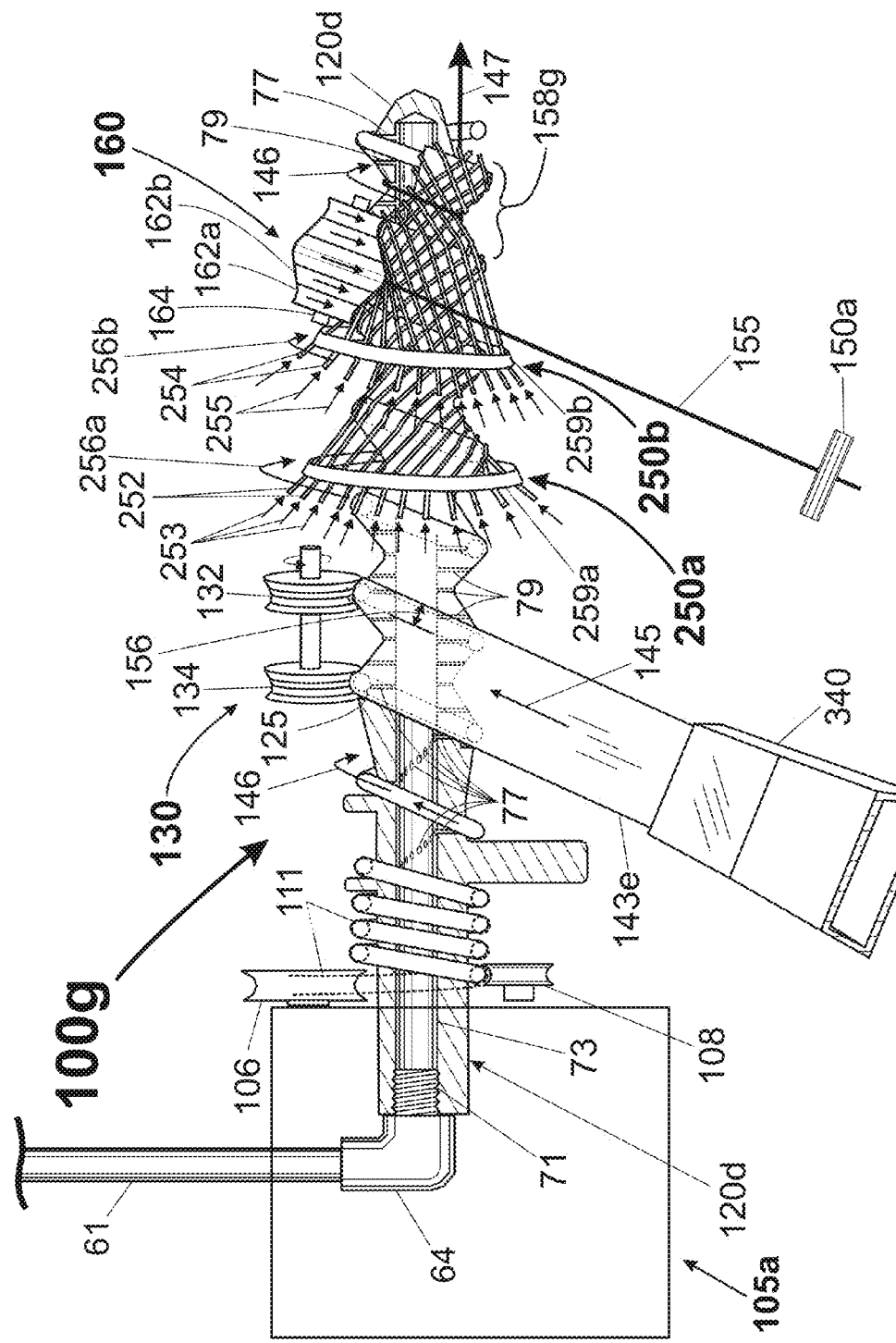

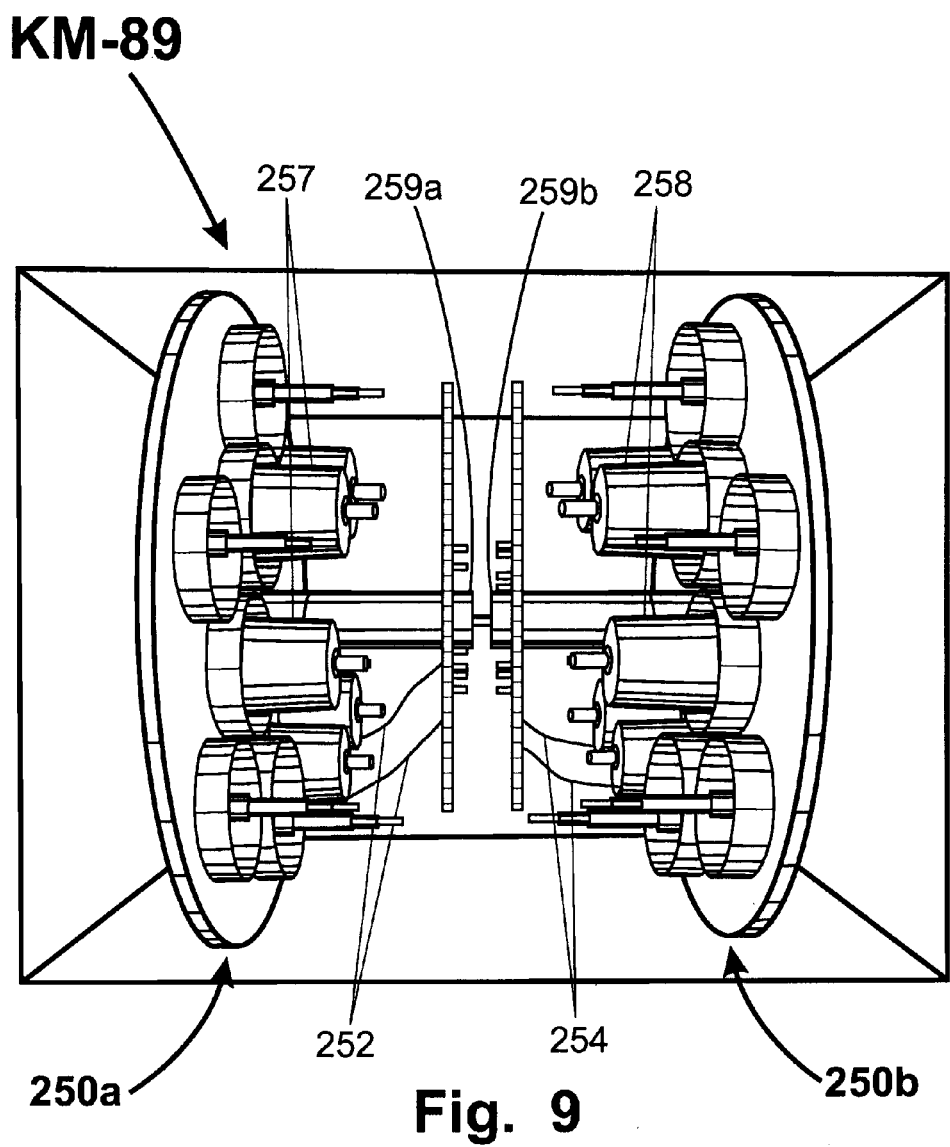

VALLEY SHAPING REINFORCEMENT

CROSS-REFERENCE TO RELATED APPLICATIONS

Figure 1:
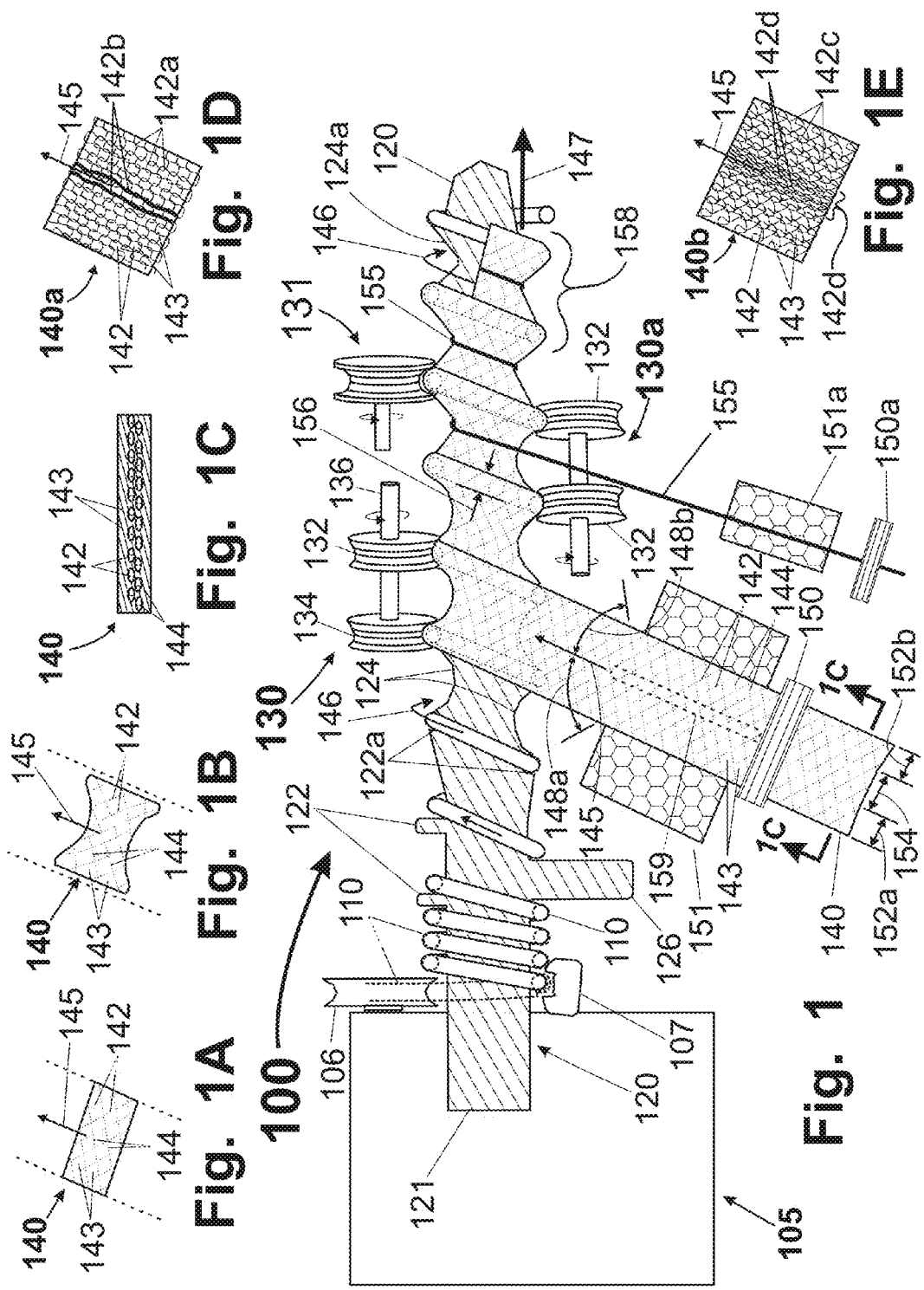

This utility application claims priority from U.S. Provisional application Ser. No. 61/517,244, filed on Apr. 15, 2011, titled: "Differentially Stretchable Reinforced Strip and Method of Manufacturing a Reinforced Stretch Hose With The Same", by sole inventor Gary Ragner. Form PTO/SB/16, in Application 61/517,244, incorrectly included a second inventor, Robert de Rochemont, Jr., who's name was accidently left on the form after copying it from a different patent application for updating.

This Utility Application also claims priority from U.S. Provisional application Ser. No. 61/607,365, filed on Mar. 6, 2012, titled: "Air Mandrel for Hose Manufacturing", by sole inventor Gary Ragner.

BACKGROUND OF INVENTION

The field of this invention relates to reinforcement for convoluted stretch hoses or conduit, and more specifically to reinforcements that assists in producing a helical valley in the hose or conduit during manufacturing and later use.

Prior art convoluted helical shaped stretch hoses and conduits, are well known. Adding reinforcement to the stretch hose is less well known because of the difficulty of reinforcing a convoluted shaped hose. Even less well known is the use of bidirectional reinforcement on a stretch hose which appears to have only been taught by the Applicant in U.S. Pat. No. 6,948,527, issued on Sep. 27, 2005, titled: "Pressure-Actuated Linearly Retractable and Extendible Hose", and U.S. Pat. No. 7,549,448, issued on Jun. 23, 2009, titled: "Linearly Retractable Pressure Hose". Also, patent application Ser. No. 10/303,941 filed Nov. 25, 2002 and its resulting Divisional patent application Ser. No. 11/234,944 filed Sep. 26, 2005 by the Applicant, do not teach forming neither a u-shaped valley nor a v-shaped valley with cord reinforcements that is parallel to the helical valley of the convoluted hose.

The thin wall construction of a stretch hose does not easily allow reinforcement to be applied. The convoluted helical shape is what allows these hoses to extend to many times their retracted length and consistently retract under their own spring power. For these hoses to self-retract easily, they can be designed with a thin walled body that is indented between coils, or expanded between the coils, to allow the hose body to extend and retract without binding against itself. Because of these physical limitations on the thickness and flexibility of the hose body, most prior art stretch hoses can only withstand pressures of about 5 Pounds per Square Inch (psi) for extended periods of time at room temperature and less at higher temperatures. Thus, some type of reinforcement is required to prevent rupture of this type of stretch hose when used with typical compressed air and household water pressures. Further, the shape of the valley portion of the convoluted hose is a factor in determining the hose's retracting ability and strength. The disclosed fiber reinforcement is applied in the valley of a convoluted stretch hose to provide one or more of the following functions: 1) to provide radial pressure strength for the hose, 2) to provide a means for shaping the hose valley into a predetermined shape, and 3) to substantially maintain the position of the valley during use and to insure the proper shape for retracting after extended use.

While many prior art stretch hoses discuss "reinforcement" for their hoses, the Examiner should understand that they are generally talking about the helical wire as the "support" or "reinforcement" against crushing, not a flexible fiber reinforcement in the helical valley of the hose to resist internal pressure. The "wire reinforcement" in prior art designs keep the hose bore from collapsing and from crushing and kinking during use, but provide little internal pressure support for resisting internal hydraulic or pneumatic pressure. The disclosed valley reinforcement provides significant pressure support for the disclosed stretch hoses, which helps stabilize the shape of the hose to insure proper extending and retracting operation.

The convoluted helical shape of a stretch hose does not led itself easily to the addition of reinforcement because of the uneven shape of the surface with its helical peak and valley. Some reinforced conduits have been built, but are made with flat sheet material that is thin enough that the sheet material can crumple under force to allow the conduit be retracted. Such conduits are generally used with a compression spring which is used to keep the hose extended for use, and user must apply force to retract the hose. Most self-retracting stretch hoses, are made from a single extruded strip of elastomer material that can be stretched over the helical wire support and rolled to form the convoluted shaped stretch hose. As soon as bidirectional reinforcement is added, problems arise because the reinforcement material can not deform with the elastomer hose material. Thus, the reinforcement strongly resists any reshaping that might be required to form the convoluted shape. Thus, prior art methods of reinforcement for cylindrically shaped hoses do not work when applied to a convoluted helical stretch hose shape. Wrapping, weaving, and knitting methods of reinforcing a convoluted hose have difficulty forming and holding the proper shape for the valley of the hose, though some methods for forming a u-shaped valley are disclosed in Divisional application Ser. No. 11/234,944. Preferably the valley can be v-shaped to allow easy extending and retracting of the hose, while also reducing stresses in longitudinal reinforcement. In other configurations, more rounded u-shaped hose valleys can be used for specific hose designs.

The use of the disclosed helical valley reinforcement solves many of the problems with maintaining the shape of the valley by providing a continuous coated yarn reinforcement placed near the center of a convoluted hose valley and/or on the walls of the valley. The yarn reinforcement can be wound in the valley of the hose and over other longitudinal and radial reinforcements. The tension on the valley reinforcement yarn prevents tension in the longitudinal yarn reinforcement from significantly deforming the valley from the desired v-shape. The yarn or cord reinforcement in other configurations can also be placed along the entire valley wall to maintain the v-shape. Thus, knitted or wrapped fiber reinforcement is forced to form a v-shaped valley by properly tensioning one or more yarns of high-strength fibers near the center of the hose valley to define the radius of the hose at the center of the valley. This process of wrapping reinforcement yarn or cord in the valley of the convoluted hose can be done by simply feeding the reinforcement yarn into the hose valley as the hose rotates pass. Such a method of valley reinforcement can produce finished hose or conduit at a rate of about one foot per second.

DEFINITIONS

The following definitions will be used throughout this document:

The term "fiber" means a unit of matter which is capable of being spun into a yarn, cord or string or made into a fabric by bonding or by interlacing in a variety of methods including weaving, knitting, braiding, felting, twisting, or webbing, and which is the basic structural element of textile products.

The terms "cord" and "yarn" mean a strand of one or more fibers in a form suitable for weaving, knitting, braiding, felting, webbing, or otherwise fabricating into a fabric. The cord can be coated or infused with a lower-strength polymer matrix. The cross-section of the cord may be round or elongated like a ribbon or other shapes. Cords and yarns can comprise woven or braided fibers, and/or cords, in many different patterns if desired, such as, braided straps and string.

The term "fabric" means any sheet material that is woven, knitted, felted, layered or otherwise produced from, or in combination with, any fiber, yarn, cord or substitute for such.

The terms "conduit" and "hose" will be used as synonyms and means a tubular structure such as a hose or tube for conveying water or air or other pressure transferable material.

The phrase "convoluted helical" is used here interchangeably with "convoluted" to describe the shape of a conduit or hose with a helical ridge and a helical valley. In the hose industry, this "convoluted helical" shape is often referred to as simply "convoluted" in shape when referring to hoses, tubes, and conduits that have this shape. A convoluted shaped stretch hose is common in vacuum cleaner industry, where the convoluted stretch hose has an outside diameter defined by a helical spring that encircles the hose along its length and a valley between the helical spring. This outside diameter or ridge where a tension spring wire is located is what provides the retracting force and radial structural support for the hose. Adjacent to this helical outer diameter or ridge is an indentation or valley that runs helically next to the helical outside diameter and forming what appears to be a corrugated hose, or accordion like structure, but is actually helical or convoluted in shape.

The term "bidirectional reinforcement" is used within this document to refer to sheet reinforcement that provides structural support in more than one direction within the plane of the hose body. The bidirectional reinforcement does not necessarily provide equal support in all directions. Bidirectional reinforcement can be provided by reinforcement cords running in at least two directions within the plane of the hose body (i.e. radial yarn and longitudinal yarn reinforcement). All knitted and woven materials provide fibers running in at least two directions to provide bidirectional reinforcement.

The term "spiral lamination manufacturing methods" is used here to describe many different hose manufacturing methods that rotate the hose being manufactured while laminating strip(s) and applying reinforcement onto the rotating hose along a spiral path. Several examples of spiral lamination manufacturing methods are shown in FIGS. 1 through 8.

SUMMARY

The thin wall nature of the convoluted stretch hoses makes it difficult to manufacture in a continuous process because of problems with damaging the walls of the hose when reinforcement and additional layers are placed on the convoluted shape. A number of methods exist for producing flexible stretch hoses that have a convoluted shape, but they do not incorporate a bidirectional fiber reinforcing layer(s) to make the conduit strong enough to withstand typical compressed air pressures and/or household water pressures. Other reinforced hoses are manufactured that provide pressure strength, but cannot extend and retract as needed because of the wall thickness of the conduit and also the improper shape and/or lack of valley coils of the hose. These high pressure hoses are also manufactured with a cylindrical shape which makes it much easier to apply reinforcement. The mechanical limitations resulting from the convoluted shape of the hose makes it difficult for prior art stretch hoses to incorporate bidirectional fiber reinforcement. To simplify this construction, the Applicant's valley reinforcement allows the convoluted hose to hold its shape during use because the valley reinforcement helps define the shape of the valley. Longitudinal reinforcement (along the length of the hose) can be applied under the valley reinforcement to provide longitudinal and/or longitudinal and radial strength to the hose while the valley reinforcement provides mostly radial pressure strength. The disclosed valley shaping reinforcement allows for a simplified manufacturing process that can reshape a longitudinally reinforced convoluted stretch hose into the desired helical convoluted stretch hose shape (u-shaped or v-shaped valley). The disclosed valley shaping reinforcement can work with the bidirectional reinforcements (knitted, woven, wound, wrapped, etc.) as well as, single direction longitudinally reinforcements, to form a retractable and extendable structure that is stable during repeated use. The disclosed valley reinforcement can also be used with un-reinforced polymer stretch hoses (polymer only hose) to provide added radial pressure strength and also to reduce deformation during extended use.

The manufacturing method and process presented here use valley shaping reinforcement that is applied substantially parallel to the helical valley of the convoluted hose. This valley reinforcement shapes the hose or conduit during manufacturing and produces a conduit that will hold its convoluted shape during extended use. By applying the valley reinforcement parallel to the hose valley the valley reinforcement can be used in continuous manufacturing (see FIGS. 1 through 6) where the spools of valley reinforcement can be substantially stationary (simply fed onto the rotating hose during manufacturing). The valley reinforcement can also be used with non-continuous manufacturing techniques that are used in industry such as mandrel wrapping methods (see FIG. 7). With valley reinforcement, a reinforced hose can easily be given the proper v-shape to allow the conduit to easily extend and self-retract. Further, the valley reinforcement will maintain the shape of the valley during repeated uses and extended time periods. Many prior art manufacturing methods that produce bidirectionally reinforced hose can be modified with the disclosed valley reinforcement to shape the bidirectionally reinforcement into the desired u-shaped or v-shaped valley for producing a reinforced stretch hose. For example, prior art reinforced cylindrical hoses with a helical wire support and bidirectional wrapped yarn or fabric reinforcement between the wire coils can be reshaped with the disclosed valley forming reinforcement to force a valley into the hose material between the wire coils with the disclosed valley reinforcement.

OBJECTIVES AND ADVANTAGES

Accordingly, several objects and advantages of the presented invention are:
  To provide bidirectional reinforcement to increase in radial pressure strength for a convoluted hose.
  To provide a differentially stretchable strip for wrapping onto a convoluted hose.

To provide a differentially stretchable reinforced strip for use in the manufacture of a bidirectionally reinforced convoluted stretch hose.

To provide a differentially stretchable reinforced strip for use in the manufacture of a bidirectionally reinforced convoluted stretch hose where the reinforced trip comprises more than one elastomer layers of different formulation.

To provide a differentially stretchable reinforced strip for use in the manufacture of a bidirectionally reinforced convoluted stretch hose where the reinforcement comprises diagonally woven cords.

To provide a differentially stretchable reinforced strip for use in the manufacture of a bidirectionally reinforced convoluted stretch hose where the reinforcement comprises two layers of cords oriented at different angles.

To provide a differentially stretchable reinforced strip for use in the manufacture of a bidirectionally reinforced convoluted stretch hose where the reinforcement comprises one or more layers of non-woven fibers and/or cords.

To provide a differentially stretchable reinforced strip for use in the manufacture of a bidirectionally reinforced convoluted stretch hose where the reinforcement comprises knitted cords.

To provide a differentially stretchable reinforced strip for use in the manufacture of a bidirectionally reinforced convoluted stretch hose where the reinforcement comprises a longitudinally differentially stretchable knit fabric.

To provide a differentially stretchable reinforced strip for use in manufacturing a bidirectionally reinforced convoluted stretch hose where the reinforcement comprises a knitted fabric with one or more longitudinally running cords to provide a valley reinforcement that holds a convoluted shape for the hose.

To provide a means of producing a convoluted helical stretch hose or conduit with a hose body comprising a differentially stretched woven reinforcing layer to provide the convoluted helical shape.

To provide a means of producing a convoluted helical stretch hose or conduit with a hose body comprising a differentially stretched knitted reinforcing layer to provide the convoluted helical shape.

To provide means of producing a convoluted helical stretch hose with a hose body comprising a two or more fiber reinforcing layers that are differentially stretched to provide the convoluted helical shape. Wherein the fibers are oriented at an angle with respect to each other to provide substantially bidirectional (two dimensional) reinforcement.

To provide a heat shielding means for differentially stretchable reinforced polymer strips to reduce heating of the strip along a particular transverse portion of the strip (i.e. the centerline of the strip 140).

To provide a means for shaping and maintaining a v-shaped and/or u-shaped valley structure for a convoluted hose shape.

To provide a means for maintaining the valley shape of a convoluted hose to a specific valley shape during use with pressurized liquids or gasses.

To provide a means for substantially maintain the depth of the valley of a convoluted hose during use with pressurized fluids or gasses to insure the proper shape for self retraction of the hose after extended use.

To provide a means for modifying the shaped of bidirectional reinforcement on a hose to produce a convoluted stretch hose so that the hose can self-retract.

To provide a means for controlling the radius of the bottom of the valley of a convoluted stretch hose.

To provide a means for increasing the pressure rating of a convoluted hose with a valley reinforcement cord.

To provide a means for supporting a plurality of longitudinal reinforcement cords against internal pressure within a convoluted stretch hose.

To provide a means of shaping a convoluted hose using fiber strand(s) wrapped in the valley of the hose.

To provide a hose comprising a valley reinforcement cord that substantially follows the bottom of the valley of a convoluted stretch hose.

To provide a hose comprising two or more valley reinforcement cords that substantially run parallel to the helical valley of a convoluted stretch hose.

To provide a hose comprising a single valley reinforcement cord that substantially forms and holds the shape of the valley of a convoluted stretch hose during use.

To provide two or more valley reinforcement cords that substantially forms and holds the shape of the valley of a convoluted stretch hose during use.

To provide a hose comprising a valley reinforcement cord wrapped over a plurality of substantially longitudinal cords, wherein the valley reinforcement substantially holds the longitudinal cords in the shape of the valley of a convoluted stretch hose and provides support against internal pressure hose.

To provide a hose comprising two or more valley reinforcement cord over a plurality of substantially longitudinal cords that substantially forms the shape of the valley of a convoluted stretch hose and provides support against internal hose pressure.

To provide a hose comprising a valley reinforcement cord that follows the valley of a bidirectionally reinforced hose and substantially forms the shape of the valley of a convoluted stretch hose.

To provide a hose comprising two or more valley reinforcement cord that follows the valley of a bidirectionally reinforced hose and substantially forms the shape of the valley of a convoluted stretch hose.

To provide a hose comprising a valley reinforcement cord within a differentially stretchable strip for substantially forming the shape of the valley of a convoluted stretch hose.

To provide a hose comprising two or more valley reinforcement cords within a differentially stretchable strip for substantially shaping the valley of a convoluted stretch hose in the differentially stretchable strip.

To provide a means for applying rolling pressure to a multi-radius surface that has portions of its surface moving at different linear speeds.

To provide a means for applying rolling pressure to a multi-radius hose, wherein portions of the roller's surface can move at different linear speeds.

To provide a roller with multiple disc sections having different radii, wherein the disc sections can rotate independently of other disc section of the roller.

To provide a roller with multiple disc sections having different radii, wherein some of the disc sections are driven and other disc sections can rotate independently of driven disc sections of the roller.

DRAWING FIGURES

FIG. 1 Side View of an example of a conduit making machine using a valley reinforcement cord 155 to form a convoluted v-shaped valley.

FIG. 1A Top View of a rectangular segment of reinforced strip 140, showing fiber orientation before stretching.

FIG. 1B Top View of the rectangular segment of reinforced strip material in FIG. 1A after deformation of the strip, and showing approximate fiber cord orientation after being stretched into a helical convoluted conduit shape.

FIG. 1C Transverse Section View of the reinforced strip material 140

FIG. 1D Top View of alternate knitted reinforced strip material 140a, showing longitudinal cords 142b within the knit pattern for reinforcement and shaping of the hose valley.

FIG. 1E Top View of alternate knitted reinforced strip material 140b, showing a warp knit with reduced longitudinal stretch stripe 142d within knit pattern 140b.

Figure 2:
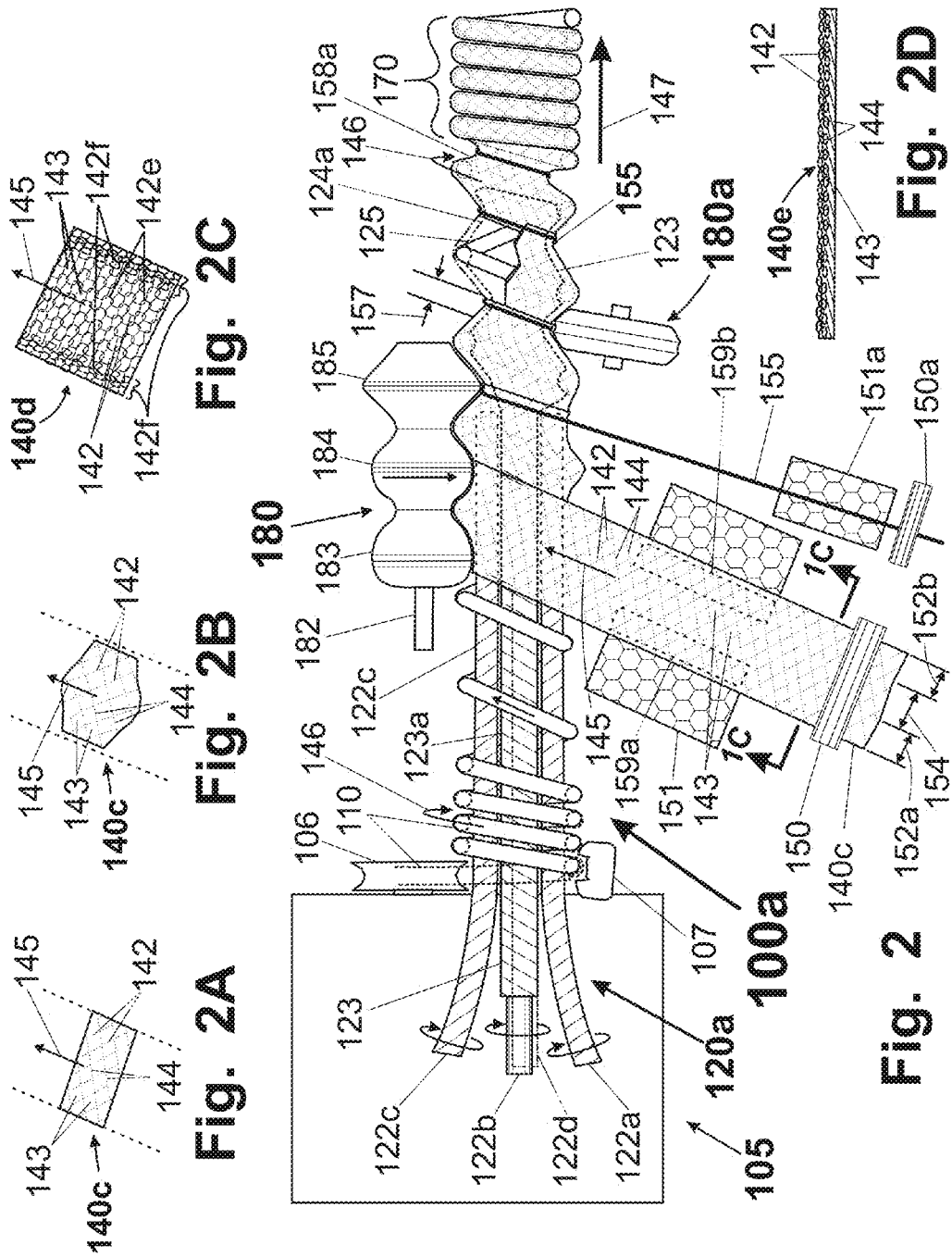

FIG. 2 Side View of a 2th example of a conduit making machine using valley reinforcement cord 155 to form a convoluted v-shaped valley.

FIG. 2A Top View of a rectangular section of reinforced strip material 140 and showing fiber orientation before stretching.

FIG. 2B Top View of the rectangular section of reinforced strip material 140 shown in FIG. 2A, and showing the approximate deformation of the polymer strip section and the fiber orientation after being stretched into a helical convoluted conduit shape.

FIG. 2C Top View of alternate warp knitted reinforced strip material 140d, showing an example knit with reduced longitudinal stretch stripes 142f within knit pattern 140d. Where stripes 142f are formed and bonded in the valley portion of hose 158a to shape the valley.

FIG. 2D Section View of alternate strip material 140e, showing an example of double wide differentially stretchable strip material similar to strip material 140h.

Figure 3:
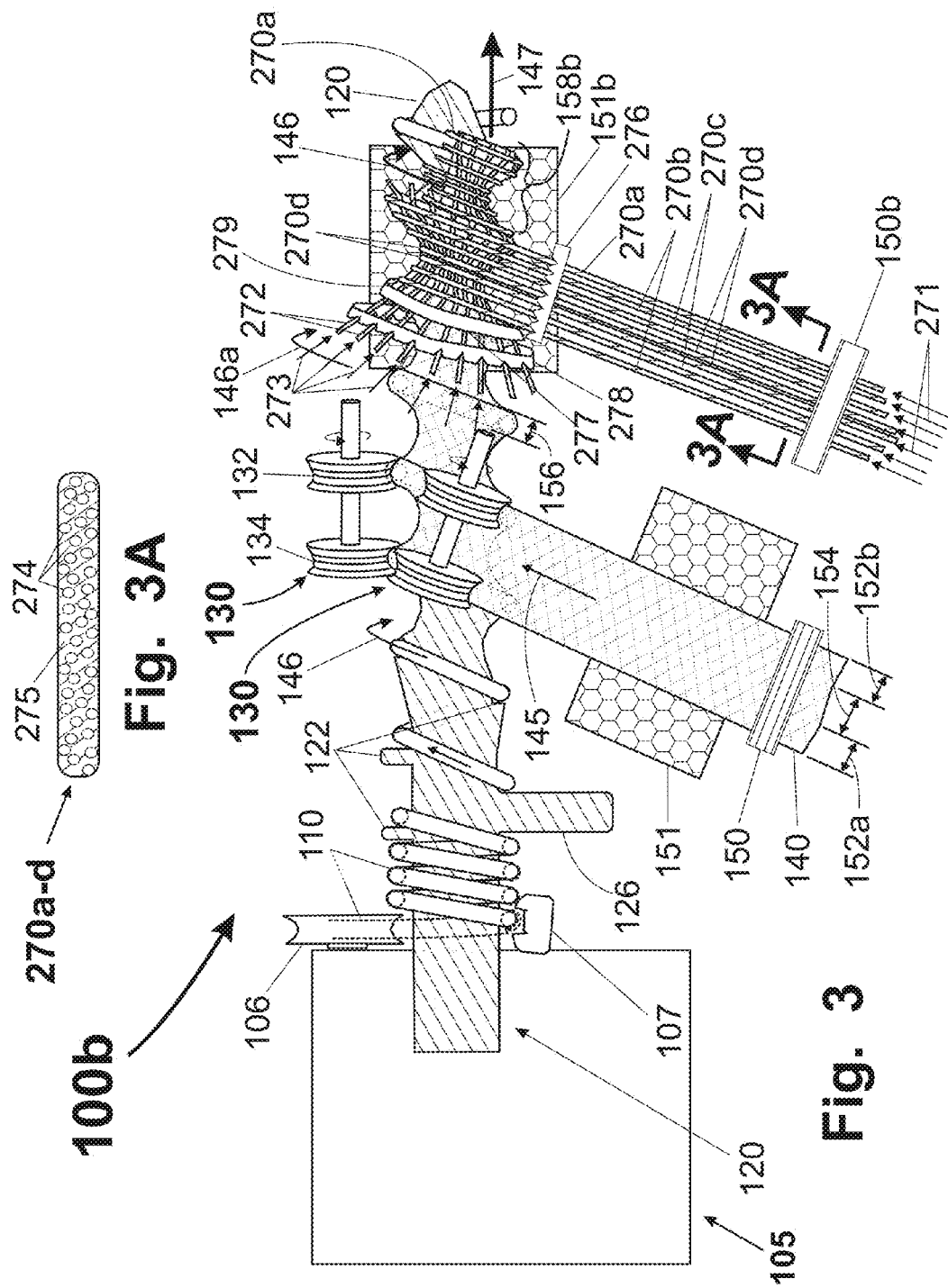

FIG. 3 Side View of a 3th example of a conduit making machine for the valley portion of a convoluted hose using valley reinforcement yarns 270a-d to form a convoluted u-shaped valley.

FIG. 3A Transverse Section View of reinforcing cord 270a through 270d.

Figure 4:
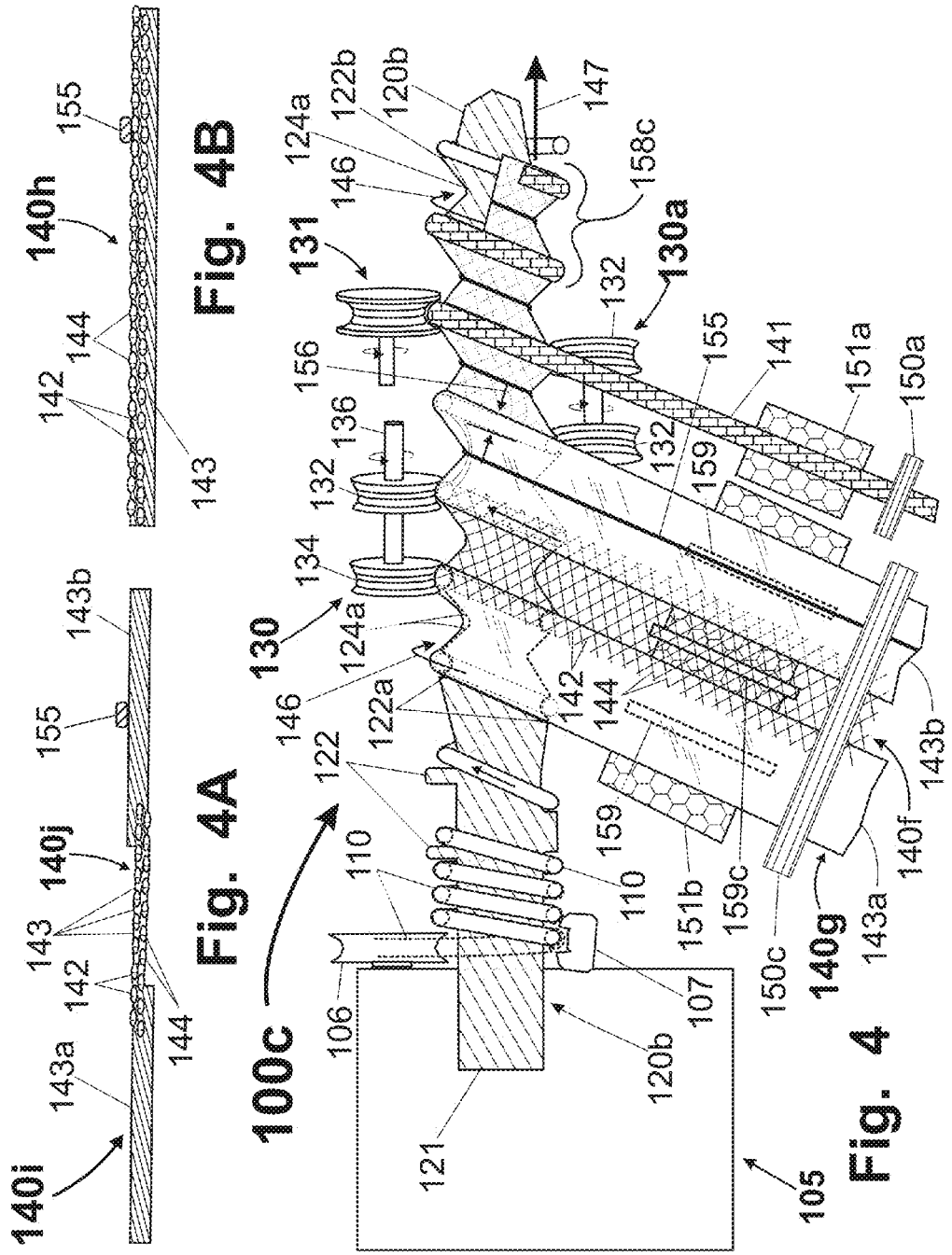

FIG. 4 Side View of a 4th example of a conduit making machine using valley shaping reinforcement cord 155 to form a convoluted v-shaped valley.

FIG. 4A Section view of strip after bonding three strips together.

FIG. 4B Section view of double wide reinforced strip.

Figure 5:
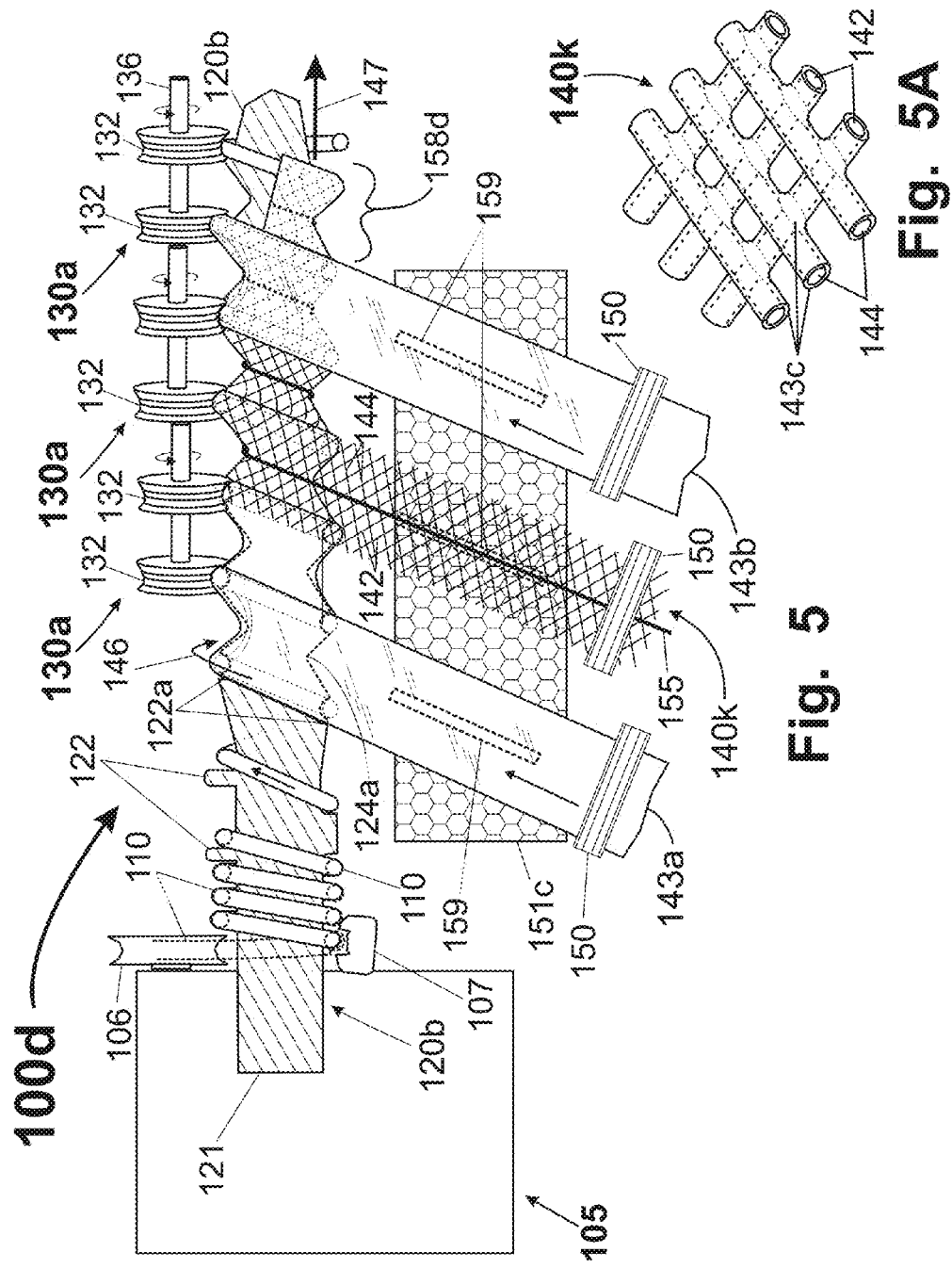

FIG. 5 Side View of a 5th example of a conduit making machine using valley shaping reinforcement cord 155 with a mesh reinforcement 140k to form a v-shaped valley.

Figure 6:
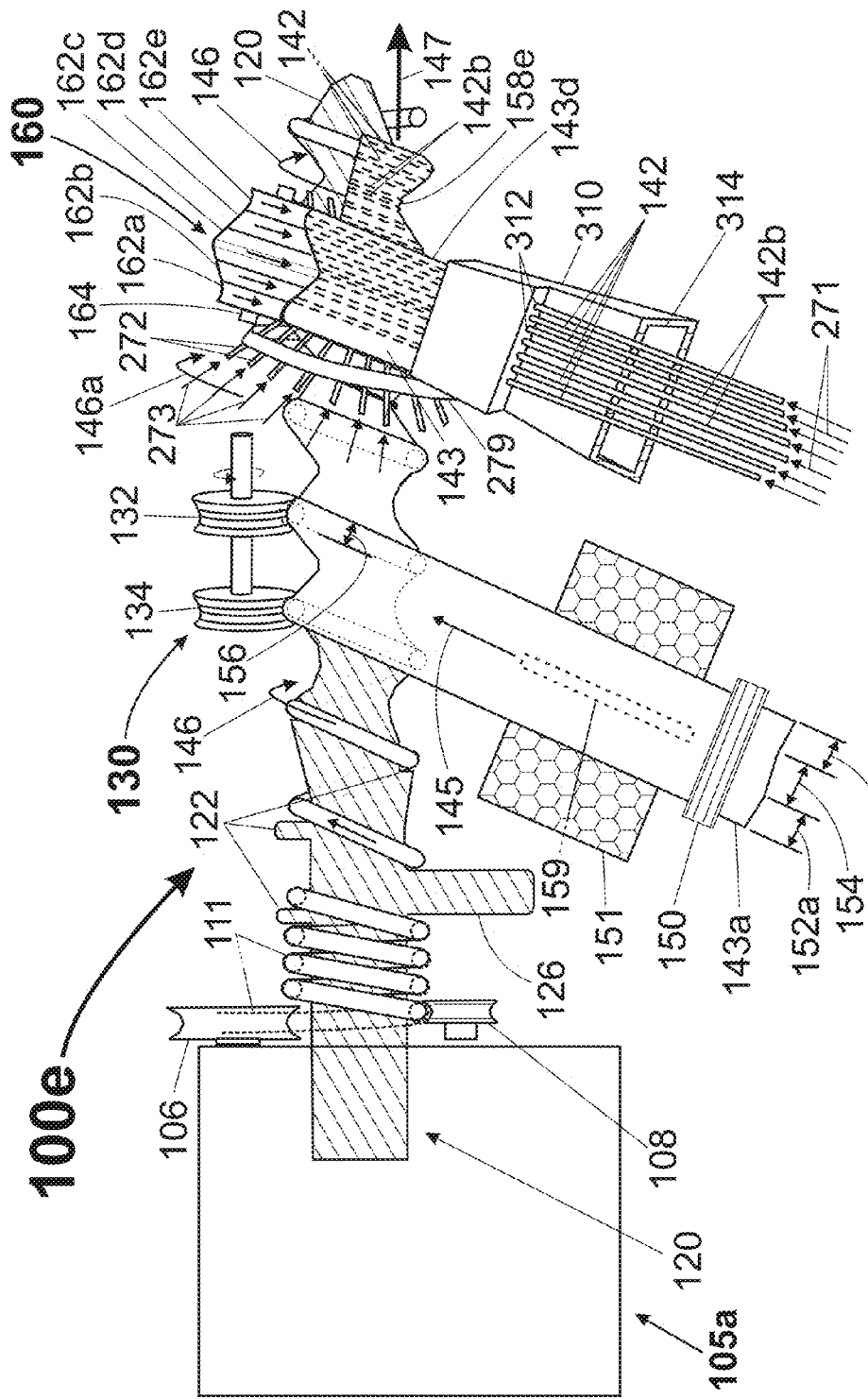

FIG. 5A Section view of an alternate non-woven fabric, using a bonding matrix material FIG. 6 Side View of a 6th example of a conduit making machine with valley shaping provided by valley reinforcement yarns 142 and 142b.

Figure 7:
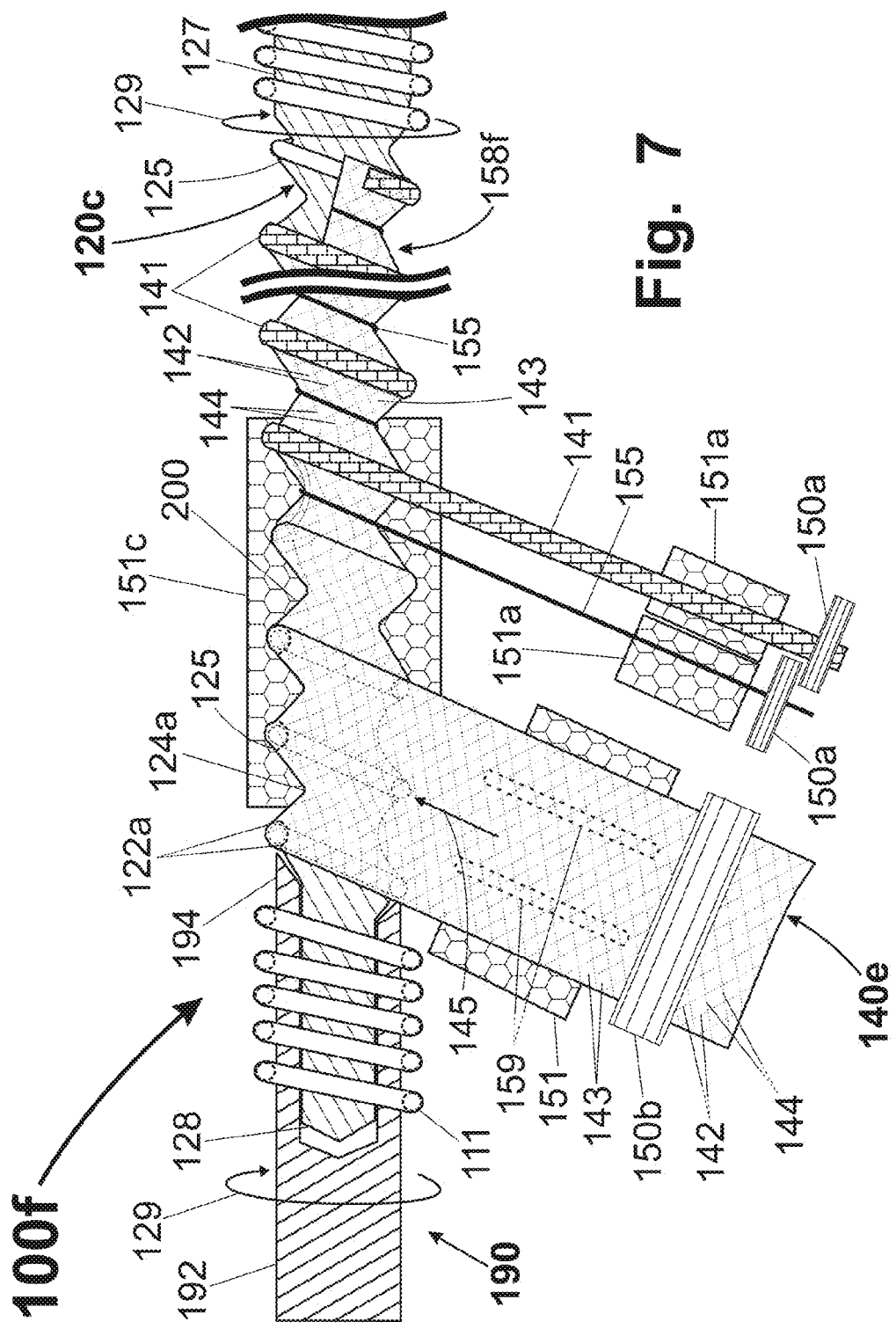

FIG. 7 Side View of a 7th example of a convoluted conduit making machine for making conduit with valley reinforcement 155 on a rotating mandrel.

FIG. 8 Side View of a 8th example of a conduit making machine that uses diagonal cord wraps and valley reinforcement 155 over the cords on an air mandrel for making convoluted hose.

FIG. 9 Photo of KM-89-SS-HS Spiral Wrapping Machine as an example of wrapping machines 250a and 250b.

DETAILED DESCRIPTION OF THE INVENTION

Valley Reinforcement Cord 155—FIGS. 1, 2, 4, 5, 6, 7 and 8

In FIGS. 1, 2, 4, 5, 6, 7 and 8, we see examples of valley forming reinforcement cord 155 used with continuous conduit making machines 100, 100a, 100c, 100d, 100e, 100f and 100g, respectfully. Valley reinforcement cord 155 is used to form and maintain a substantially v-shaped valley on the convoluted hoses made by these machines. Because of the shape of convoluted hoses, valley reinforcement cord 155 naturally tends to seek the bottom of the valley as it is wrapped onto the hose. The smaller radius of the bottom of the valley serves to lock cord 155 in place on the hose. Several different examples of the disclosed valley reinforcement are discussed within this document. The reader should understand that these examples do not provide a complete list of possible configurations for placement and means of manufacturing a hose with valley reinforcement, but instead are selected examples for the invention to give someone skilled in the art of hose making a clear understanding of how to use the valley reinforcement. From these examples, someone skilled in the art of hose making can generate a multitude of additional configurations for the valley reinforcement.

Example Conduit Making Machine 100—FIG. 1

Conduit making machine 100, comprises a spring coiling machine 105, a mandrel 120, forming roller assemblies 130, 130a and 131, tensioning rollers 150 and 150a, and heater 151 and 151a for making finished conduit 158. Spring bending machine 105 comprises a standard spring bending machine with drive rollers 106 (only one shown for drawing clarity) and wire bending tool 107. While spring coiling machine 105 (also called a wire bending machine or wire coiling machine) is not drawn here in detail. Spring coiling machines are well known to people in the industry and can be purchased and used for the disclosed conduit making machine with little or no modification. Bending tool 107 is often called a point tool because the wire interacts with the tool at substantially a single point to cause it to bend into a helical spring. Point tool 107 is usually made of a hardened steel or other very hard metal that has very low wear properties. The coil radius is determined by how far the point tool is from the wire feeder guide (hidden behind mandrel 120) of coiling machine 105, and at what angle it is oriented, and the type of wire being bent. Many other types and styles of wire coiling machines already exist which can be used in place of coiling machine 105.

Spring wire 110 can be uncoated, meaning there is no polymer coating, and the wire's metal surface is exposed. This means wire 110 can be plasma sprayed, chemically treated, galvanized and/or other metallic coating process to provide corrosion resistance and tough outer surface without significantly increasing the diameter of the wire. If wire 110 were coated with a polymer coating, point tool 107 would damage the polymer coating with the high contact forces. Thus, for coated wire, alternate wire coiling machine 105a can be used, which uses a roller point tool 108 seen in FIG. 6, where a coated wire 111 can be bent gradually by roller(s) 108 to reduce stresses on the polymer coating. The material for spring wire 110 is selected to provide the desire retracting force and stiffness needed for the particular conduit being made. A strong resilient spring wire can be chosen for wire 110, because of the strong retracting force desired for finished conduit 158. Wire 110 in this example is not coated with polymer to help increase the extension ratio of the conduit by reducing the coil width. Notice that coiled wire 110 does not add significant positive pressure strength to the hose or conduit, but it does provide a significant portion of the crushing strength of the finished conduit, especially when the conduit is retracted and not pressurized.

Wire 110 can comprise any spring material, such as, spring steel, stainless spring steel, titanium spring alloy, piano wire and even composite springs such as glass fiber composites, graphite composites, and etc. For use with water, wire 110 can be made of a stainless steel alloy to prevent rusting and corrosion. Wire 110 can also be made of a corrodible metal, such as high-carbon steel, and can still be used in wet environments if spray coated with other metals such as tin, zinc and nickel to improve its corrosion resistance and these coatings can be applied in a number of ways, such as, electrolysis, plasma spray, chemical dip, etc. If composite springs or other pre-formed springs are used, then spring coiling machine 105 is not needed and the composite spring would feed onto mandrel 120 at shaft end 121. In order to feed a spring onto mandrel 120 in this way, support bracket 126 can be used to fix mandrel 120 in place with respect to rollers 130 and 131 and other equipment. Bracket 126 is securely bonded/attached to mandrel 120 in this example and is narrow enough to easily allow coiled spring 110 to feed around it as coiled spring wire 110 is shown in FIG. 1.

In FIG. 1, Mandrel 120 can be made of nearly any hard metal such as hardened steel, stainless steel, etc. and can be fastened to wire coiling machine 105 if desired, or can be fastened to another mechanical support structure (not shown). Mandrel 120 comprises shaft end 121, spring guide 122, wire molding groove 122a, a u-shaped hose forming valley 124, a v-shaped hose forming valley 124a, and support bracket 126. All the mandrels presented in this patent are shaped to form the conduit in its fully extended state. This is to reduce stress on the hose when pressurized and extended. This allows the conduit can be substantially free of creases or wrinkles when extended and pressurized. The mandrel can form convoluted hose at less than its fully extended shape if care is taken to properly shape the hose for that retracted position. When the conduit is retracted, the hose body (strip material) can fold and wrinkle as needed to compress the hose. Since very little stress is on the conduit when retracted there are no high stress points on the strip material to damage it. Mandrel 120 can comprise a number of different alternate designs for rotationally feeding coiled wire 110, such as, prior art designs with multiple parallel rollers that form the mandrel and rotate in the same direction to feed coiled wire 110 like mandrel 120a seen in FIG. 2. With rollers on both the inside and the outside portion of overlap region 156, can provide many low friction rolling surfaces to compress and bond the seam area 156. Mandrel 120 can be coated with a low friction coating so that strip material 140 can slide freely over the exterior surface of mandrel 120. For this design mandrel 120 initially has a u-shaped valley 124 for bonding strip 140 together, but then shifts to a v-shaped valley 124a to allow valley reinforcement to reshape hose 158 into the desired v-shaped conduit. In other designs, the v-shaped valley 124a can be used along the entire length of the mandrel 120b as seen in FIGS. 4 and 5.

Within this document, valley forming reinforcement cords 142b, 142d, 142f, 155 and 270d can comprise nearly any flexible a high strength materials such as nylon, aramids, polypropylene, polyester, glass, carbon, and other high-strength fibers. For highest strength, cords 142b, 142d, 142f, 155 and 270d can be formed from stretched fibers, or even a monofilament. Cords 142b, 142d, 142f, 155 and 270d can be formed from twisted or untwisted fibers and can also be woven knitted or braided if desired. Many different weaving, knitting and braiding patterns can be used to form cords 142b, 142d, 142f, 155 and 270d into the desired structure and shape, such as, braided string and flat straps.

In FIG. 1, hose making machine 100 has an upper speed limit of approximately one-thousand coils per minute for a one inch diameter hose. A 0.020 inch polymer coating on the wire creates 0.040 inches of plastic per coil and adds forty inches to the retracted length of the fifty foot conduit with one-thousand coils. Thus, using wire that does not need to be coated with a polymer has a great advantage in reducing the overall length of stretch conduit 158 when retracted and giving conduit 158 and the other conduits in this patent a greater extension ratio over prior art.

Wire 110 can also be a composite spring, such as glass/resin, carbon fiber/resin, aramid fiber/resin, etc. which can have comparable spring force to steel and highly resistant to corrosion. Multiple resins can be used with composite springs including but not limited to epoxies, polyesters, and urethanes. If a composite spring is used, it can be pre-formed and fed onto mandrel 120 from the left in FIG. 1. Support 126 would provide structural stability for mandrel 120 holding it in place as the composite spring would rotate around mandrel 120 and follow guide 122 just like the metallic spring shown. However, with a composite spring, wire coiling machine 105 would no longer be needed, and the composite spring could be molded prior to going onto mandrel 120. In alternative designs the composite spring can be formed by hot molding just prior to going on mandrel 120, 120a, or 120b, with sufficient time for cooling and setting of the composite spring in a tension spring configuration before going into conduit making machines 100, 100a, 100b, 100c, 100d or 100e. The use of coiled metallic wire or coiled composite spring is a user preference and either could be used with the example conduit making machines shown in this patent.

In FIG. 1, strip heaters 151 and 151a can be electric radiant heaters that quickly heat strip 140 and valley reinforcement 155, respectfully, before being wound onto coiled wire 110 as it rotates. If strip 140 were extruded, then heater 151 is not needed since the extruded strip would be very hot already and easily stretched and bonded to itself. Heaters 151 and 151a can be standard thermally controlled heater that can provide precise heating to polymer strip 140 and coated cord 155, and in general can enclose the materials fed through it to heat both sides of the strips at the same time. The power level used by heaters 151 and 151a would be adjusted to sufficiently heat a polymer matrix material 143 so that it can be plastically stretched without undue force. In the case of valley reinforcement cord 155, heater 151a might simply heat the underside of the cord as shown in FIG. 1 since only one side of cord 155 makes contacting strip 140 as it is bonded. This heating can also prepare cord 155 for bonding to other portions of the hose's valley besides the bottom of the valley shown in FIG. 1. In some cases, additional heaters might be needed to reheat the outer surface of strip 140 near the location where strip 140 and cord 155 meet to insure a good melt surface and provide consistent bonding. Since hose production with the disclosed machine 100 is very fast (up to one feet per second) there is little time for strip 140 to cool. Heaters 151 and 151a can be placed near mandrel 120 so the exterior of previously layered strip 140 can receive some of the heat from heaters 151 and 151a, and keep the surface of strip 140 soft to allow better bonding.

In alternate designs, strips 140, 140c, 141, 143a-b and 143e in FIGS. 1, 2, 3, 4, 5, 6, and 7, can be replaced with an extruded polymer strip similar to strip material 143a, 143b, and wear strip 141 (see extruded strips 143d and 143a in FIGS. 6 and 8, respectfully). These strips can be extruded just prior to being wrapped on the hose. The extrusion process reduces the number of ways the strip can be reinforced, but does allow for reinforcement (i.e. by cross-extrusion with cord reinforcements 142 and 142b seen in FIG. 6, and cross extrusion of other reinforcements, i.e. fabric strips). The use of extruded strips for strips 140, 140c, 141, 143a-b and 143e, an extruded wear strip for wear strip 141 and a cross-extruded cord for valley reinforcement cords 155, and 270a-d can eliminate the need for heaters 151, and 151a-c, and tensioning rollers 150, and 150a-c.

In FIGS. 1-3, 5, 6 and 7, tensioning rollers 150 can comprise a pair of opposed rollers that can sandwich their respective strip between them. In FIG. 1, for example, strip 140 is pressed between rollers 150 so that friction between the rollers and the strip causes the strip to have the same linear speed as the surface of rollers 150. Mechanical or electronic controls attached to rollers 150 (not shown) can be used to adjust the speed and/or force on the rollers so that the surface speed difference between rollers 150 and coiled spring wire 110 provides the proper amount of stretch as strip 140 is wrapped on wire 110 in the convoluted helical shape of mandrel 120. Too much stretching of strip 140 and it can narrow transversely so that it does not extend completely between the adjacent coils of wire 110. Too little stretching of strip 140 and it will not deform completely into valley 124 and form the correctly shaped conduit. In most situations the speed of rollers 150 will be controlled relative to the speed of rotation of coiled wire 110 so that wire 110 stretches reinforced strip 140 the correct amount in transverse portions 152a and 152b, and tapering to almost no stretch at the center line of strip 140 (center of transverse portion 154). Wear strip 141 can also have a tensioning roller assembly 150a like rollers 150, but because of the durable nature of strip 141 and the small width (i.e. 0.125 inches wide) a simple friction tension device (not shown) would be sufficient and might consist of nothing more than feeding strip 141 through one or more stationary guides. This is especially true if only the underside (bonding surface) is heated so the strength of the top surface remains to prevent stretching even if friction forces are slightly high or varies with time. Note that in FIGS. 1 through 3, the bottom rollers of tensioning rollers 150 and 150a can not be seen because the top roller hides it.

In FIGS. 1, 3, 4 and 6, roller assembly 130 comprise two rollers 132 and 134 connected on a single shaft 136. In alternate designs, single independent rollers can be used or rollers 132 and 134 can rotate independently of each other and/or independently of shaft 136. Rollers 132 and 134 are representative of the vast number of roller systems that could be used to press together adjacent layers of strip material 140 after heating to fully bond the edges of strip 140 to itself at bonding zone 156. The rolling surfaces of rollers 132 and 134 can be textured with knurling or other textured patterns for gripping strip 140 securely when wrapped onto wire 110. This textured rolling surface is especially important if wire 110 is not coated with a polymer and a slippery elastomer like polyvinyl chloride (PVC) is use. Polymer coatings on wire 110 are common for vacuum stretch hoses to give the applied strip something to stick to and prevent slipping. If a polymer coating is not used, strip 140 may not stick to wire 110 and could easily slip off if measures are not taken to hold it in place. By texturing the contact surface of rollers 132 and 134, and positioning them where strip 140 first contact wire 110 it is possible to wrap strip 140 on coiled wire 110 as shown. For higher speed processing it may be necessary to provide additional rollers and conveyors to insure that strip 140 can be guided and molded around coiled wire 110 without slipping from its desired position.

In FIGS. 1, 2, 3, 4, 5, 6 and 8, forming rollers 130, 130a, 131, 160, 180 and 180a can be driven or passive depending on how the manufacturing system is set up. This is because the driving force behind wires 110 from spring coiling machine 105 can be very high. Wire 110 is bent around mandrel 120 with considerable force. This means these roller assemblies can be powered or un-powered. If un-powered, the force of wire 110 would simply rotate the rollers as wire 110 and covering 140 is forced around the mandrel. If powered, rollers 130, 130a, 131, 160, 180 and 180a can help pull the conduit around the mandrel. In some cases, it can be desirable for the roller(s) to provide a restricting force or drag on the rotating wire coil to force the strip edges together. In many designs, it can be desirable to have additional powered roller assemblies 130, 130a, 131, 160, 180 and 180a surrounding mandrel 120 to provide complete support of the conduit and to provide motivating force to the strip material to keep it moving around its mandrel. For example, by placing many additional powered rollers 130a in contact with strip 140 a greater motivating force can be applied to strip 140 at wire 110 and keep the hose moving with coiled wire 110 (no slippage). By placing rollers on opposite sides of mandrel 120 forces can cancel so there is only a small force exists pressing strip 140 against mandrel 120 and thus producing only a small friction force resisting the motion of strip 140. Note that in the presented examples rollers 142 and 144 are angled in the direction of the wire coil (see front roller assembly 130 in FIG. 3). This angling of roller assemblies 130 and 130a, and others, allows two rollers on a single shaft to align with the wire coil and strip material 140 and press the seam to the desired shape. On-angle rollers (such as rollers 180) with its axis aligned with the hose axis, cannot have the exact shape of the seam, but can be made wider to allow the off-angle of the wire to roll through the roller without binding.

Roller Assemblies 130a are similar to roller assemblies 130, but have two rollers 132 which are the same diameter to roll the same thickness of layered strip material 140, and the like. While the difference between the thickness at roller 142 and the thickness at roller 144 might only be a few thousandths of an inch, it is discussed here to address the slight difference in surface speed of the hose because of this difference in thickness. In FIG. 1, additional roller assemblies 130a can be placed further to the right of assembly 130 and assembly 130a if mandrel 120 were lengthen, which would provide additional support across the conduit bonding section. With rollers like 130, 130a, 131, and 180 completely surrounding mandrel 120, coiled wire 110 and bonded strip 140 is effectively trapped within the rollers and form a tunnel like set of rollers for coiled wire 110 and strip 140 to revolve within. Placement of rollers on opposite sides of the mandrel can remove much of the friction between wire 110 and mandrel 120 because of the equalization of forces of the rollers. With rollers surrounding the mandrel, wire coil 110 can also be forced into a smaller radial diameter by the rollers and provide greater force without pushing wire 110 against mandrel 120 (mandrel would need to be made smaller to accommodate the smaller compressed wire coil diameter). With surrounding rollers providing a retarding force on the wire, this force results in a radial pressure trying to expand the wire coil which increases the force exerted on rollers 132 and 134 by wire 110. In this way, friction control of roller assemblies 130 and 130a can be used as an alternative way to control the pressure exerted to bond strip 140 to itself and mold it around wire 110. Coiling machine 105a can be used to replace coiling machine 105 in the disclosed examples when coated wire 111 is used, and can function in the same way as coiling machine 105.

In FIGS. 1, 1a-c, and 3 polymer strip 140 is an elongated strip of material used to build conduits in a continuous process. Because the process is desired to be continuous, in this example, the length of strip 140 must be relatively long so that splices between manufactured strips can be widely spaced. Spliced joints would normally be cut out of the finish conduits. Thus, practical conduits strip material lengths must be long enough to produce at least one conduit. Since approximately thirty meters of strip 140 is needed to produce a single fifty foot long linearly retractable garden hose (extended length), strip 140 would preferably come in strip lengths of 1000 meters or more, so that a dozen hoses or more can be made between splices. Also, strip 140 can be replaced by many of the other differentially stretchable strips, such as, strips 140c, 140d, 140e, 140k, 143a, 143b, as well as, extruded strips 143d, or 143e, depending on the final use of the hose or conduit. For example, if a low pressure drainage hose is needed, strip 140 might be replaced with unreinforced strip 143a, or 143b, or unreinforced extruded strip 143e to provide a light weight valley reinforced stretch hose.

Strip 140 can have a composite construction comprising a water proof polymer matrix material 143 bonded around a fiber based reinforcement layer comprised of fiber cords 142 and 144. The exact composition of polymer matrix 143 and cords 142 and 144 is not critical to the invention and many combinations are possible. For example, in FIGS. 1, 1A-E, and 3 polymer matrix material 143, and polymer matrix strips 143a-b can comprise an engineered polymer, copolymer, or blend of polymers, such as, urethanes, polypropylenes, neoprenes, nylons, etc. combined with plasticizers or other additives (i.e. small incompatible rubber inclusions) to significantly lower the Young's Modulus (tensile modulus) of the matrix and make its properties closer to that of rubber. Polymer materials 143, and 143a-b, can also be an elastomer or a thermoplastic elastomers such as, but not limited to, unsaturated rubbers like: natural rubber (NR), polyisoprene (IR), butyl rubber (IIR), halogenated butyl rubber (CIIR and BIIR), polybutadiene (BR), styrene-butadiene (SBR), Nitrile Rubber (NBR and NHBR), chloroprene rubber (CR), polychloroprene (CR), Neoprene (CR), saturated rubbers that cannot be cured by sulfur vulcanization, like: ethylene propylene rubber (EPM), Epichlorohydrin rubber (ECO), Polyacrylic rubber (ACM, ABR), silicone rubber (SI, Q, VMQ), fluorosilicone rubber (FVMQ), Fluoroelastomers (FKM and FEPM), perfluoroelastomers (FFKM), polyether block amides (PEBA), Chlorosulfonated polyethylene (CSM), Ethylene-vinyl acitate (EVA), and various other types of elastomers, like: Thermoplastic elastomers (TPE), Thermoplastic Vulcanized (TPV), thermoplastic polyurethane (TPU), thermoplastic olefins (TPO), proteins, resilin elastin, and polysulfide rubber. Polymer matrix materials 143, and 143a-b can also be made of natural polymers like rubber, and other natural elastic polymers. These matrix materials are infused around cords 142 and 144 to provide a water tight seal that can flex thousands of times without cracking or leaking. In section view of strip 140 in FIG. 1C we can see that cords 142 and 144 are completely encased in matrix material 143. Matrix materials 143 and 149 serve the functions of holding cords 142 and 144 together in a fabric or sheet form, and also waterproofing the fabric or sheets and make it substantially impermeable to water and/or air. Cords 142 and 144 when formed around a conduit provide a bidirectional reinforcement that gives the conduit or hose strength in both the radial and longitudinal directions. Matrix materials 143, and 143a-b can have a lower ultimate tensile strengths generally less then 10,000 psi (69 MPa) and a Young's Modulus less than 50,000 psi (345 MPa). Typical values for an elastomer for matrix material 143 might have an ultimate tensile strength of 3,000 psi (21 MPa) and an elastic modulus of 5,000 psi (35 MPa). Polymer matrix materials 143, and 143a-b should be relatively flexible, and in most conduits, the polymer matrix can have a durometer near eighty-five on the shore A scale. While durometer is not an measure of flexibility, it does give an indication of the flexibility of the material and is used here crudely to give the reader a general sense of the flexibility of the desired matrix material.

Strip 140 and others in this document can have multiple layers of matrix materials as is common in the hose industry. Each layer may have drastically different properties depending on the properties desired for the finished conduit. For example, one can have a high durometer for one particular conduit design that needs high puncture resistance, while another conduit that needs maximum flexibility may require a low durometer for materials 143a-b and 143. Thus, matrix materials 143, and 143a-b can all be given predetermined durometer, tensile strength, flexural modulus, resistance to solvents, high temperature properties, low temperature properties, and other material properties as is dictated by the needs of a particular conduit and its purpose or end use.

In all the FIGS. 1 through 8 fiber cords 142, 142b, 144, 155, 252, 254, and 270a-d can comprise one or more strands of any high strength fiber material, including, but not limited to, nylon, aramid, polypropylene, polyester, glass, carbon, and other fibers. Cords 142 and 144 used in the differentially stretchable strips should have a higher deflection temperature than polymer matrix 143 to allow differential stretching. To produce these high strength fibers, manufactures stretch the fibers while hot (melt stretching) or while cold (cold drawing) to align the polymer chains and make the fiber more crystalline. This aligned crystalline state provides very high tensile strength in the longitudinal axis of the fiber. Fiber cords 142, 142b, 144, 155, 252, 254, and 270a-d are preferably have a tensile strength generally greater than 15,000 psi (211 Mpa) and a Young's modulus greater than 50,000 psi (the fiber cords typically have a significantly greater Young's Modulus than that of matrix 143). Fiber cords 142, 142b, 144, 155, 252, 254, and 270a-d can have an elastic modulus greater than 1,000,000 psi (7,000 MPa or 7 Gpa), depending on the fiber used, but preferably is made of inexpensive fibers, such as, polyester and/or nylon micro-fibers which have tensile strengths of around 60,000 to 70,000 psi and an linear elastic modulus around 1,000,000 to 2,000,000 psi. The high modulus prevents the fibers from stretching significantly (deforming from their original length) even when under high operating tension. For the example strip 140, fiber cords 142 and 144 will normally have a much higher melting temperature than matrix 143. Thus, when matrix 143 is heated near its melting point and/or heat deflection temperature, and/or vicat softening point, and/or becomes plastic (deformable), cords 142 and 144 still may not stretch significantly longitudinally or change length significantly during stretching of matrix 143. This is because of cords 142 and 144 are designed to have higher deflection temperature. Such fibers generally have a high percentage of crystalline structure and tend not to stretch or deform even when near their melting point. Note that valley forming reinforcement cords 142b, 155, and 270a-d can comprise the same fiber materials as fiber cords 142 and 144. Similarly, knitted valley reinforcement structures 142d and 142f can comprise the same fiber materials as cords 142 and 144.

In FIGS. 1 through 8, polymer strips 140, 140a-e and 143a-b can each be made with elastomer 143 and can comprise a woven, wrapped and/or knitted cords 142, 142b, 144, 270a-d, 252 and 254, where each set of cords can be formed from many individual fibers. Other examples of ways cords can be positioned within polymer matrix 143 and provide reinforcement are seen in FIGS. 1 through 8). Cords 142 and 144 can be knitted and/or woven to form a woven bidirectional fabric sheet. Cords 142 and 144 can also be non-woven and placed in layers within polymer 143. In FIG. 1C we see a transverse section view of strip 140. Only the ends of cords 142 and 144 are visible, but the cords preferably weave in and out of each other as one goes further into matrix 143. In FIG. 1D we see a weft knit structure 142a knitted from fiber cord 142 which forms a fabric with valley reinforcement cords 142b woven within the knit. In FIG. 1E, we see strip 140b with a low stretch warp knit fabric structure 142d in the center and a stretchable warp knit fabric structure 142c on the sides can all be knitted from fiber cord(s) 142 or combinations of other cords. In each case, the cords are bonded within matrix material 143 which is preferably an elastomer that can allow that strip to easily flex away from the plane of the strip. For example, fiber cords 142 and 144 might be made of a low denier nylon fibers with a tensile strength around 60,000 psi, while matrix 143 might be a polymer and/or elastomer based on polyurethane or other polymers having a maximum tensile strength of 4,000 psi, and an elastic modulus of 5,000 psi, which is significantly less than the cords. During wrapping onto the conduit, matrix 143 can have a lower melting temperature, and/or lower plastic deformation temperature and/or heat deflection temperature, and/or vicat softening point than the cords to allow the matrix material to deform without having to change the length nor heat damaging fiber cords 142 and 144. The diagonal angle of cords 142 and 144 along strip 140 allow the matrix to deform longitudinally while the cords shift with the stretching of matrix 143. After matrix 143 cools, cords 142 and 144 are locked into place and strip 140 becomes stiff in the plane of the cords, but can flex easily out of the plane of the strip. For the purposes of this patent, the reinforced polymer strips 140 can be used with other appropriate conduit making machines disclosed within this document. Polymer strip 140 is used extensively throughout this patent as an example, but the reader should understanding many of its properties are similar to strips 140a-h, and many other methods can be used to produce the basic bi-directionally reinforcement on a convoluted hose.

In this document, strips 140, 140a-k and 143a-b (and other strip materials) can stretch differentially in the longitudinal direction (in direction 145) because of the way cords 142 and 144 are oriented with respect to the longitudinal direction 145 of the strip. The orientation of the cords also provide bidirectional reinforcement so that both radial and longitudinal forces on the hose are supported. Cords 142 and 144 are oriented in these strips so that they can stretch longitudinally. For strips 140, 140c, and 140e-k cords 142 and 144 can be oriented with angles 148a-b (see FIG. 1) preferably being greater than forty degrees, but less than seventy-five degrees, to allow the woven fabric to stretch easily in the longitudinal direction 145, but not have the cords too close to being aligned transversely. This physical arrangement of diagonally angled fiber cords allows each transverse portion of strips 140, 140c, and 140e-k to stretch longitudinally at different rates than other transverse portions of the strip. For example, in FIGS. 1, 3, and 6 the transverse portions 152a and 152b of the differentially stretchable strips are stretched longitudinally considerably more in these examples than center transverse portion 154. In some configurations, a heating guard 159 can be used to protect the center portions of the strips and prevent that portion from reaching a high enough temperature to become easily stretchable (deformable), and thus providing a portion of the strip that will not easily stretch by the tension from rollers 150. With strip 140 having a cool center portion 154, in FIGS. 1, and 3, rollers 150 can provide sufficient resistance to the strips to stretch the side portions 152a-b onto coiled wire 110 and lay the center portion at the bottom of valley 124. In general, rollers 150 will be set to a predetermined percentage of the speed of wire 110 so that strip 140 is continuously stretching the portion 152a-b of the strip that contacts wire 110 by that percentage. Portions 154 of strip 140 that go into valley portion 124 will stretch much less, or very little, and thus forms a smaller radius. In many example, the center of portion 154 may stretch only a small amount because it is protected from heating by heat guard 159 which is mounted between heater 151 and strip 140. Thus as strip 140 is wound onto wire 110, different transverse portions of strip 140 are being stretched at different rates and are actually is being wound onto conduit 158 at different speeds even thought strip 140 is being fed into the system at a constant speed at rollers 150 before heating and stretching is preformed. The other disclosed differentially stretchable strips disclosed in this document can operate in a similar manner.

In FIGS. 4 and 7, wear strip 141 comprises a polymer blend that is highly wear resistant. Because wear strip 141 is bonded adjacent wire 110, wear strip 141 does not stretch significantly as the hose extends and retracts. Thus wear strip 141 can comprise a metal alloy, hard wear resistant polymer(s), reinforced composite, or other highly wear resistant material that can be bonded to and/or crimped on the exterior ridge of bonded strip 140. Examples of materials that might be used for wear strip 141 include, but are not limited to, stainless steel strip, brass, other non-corrosive metals, and alloys Polyurethane (TPU or PU), PET, ABS, Nylon, HDPE, Polypropylene, and other wear resistant polymers, polymer composites and polymer combinations. During heating of strip 141, only the underside needs to be heated, or adhesive applied, so that bonding takes place between strip 141 and strip 140. If strips 140 and 141 are incompatible with heat fusing, then adhesives or intermediate layers can be used to bond the two strips together. Alternatively, the entire strip 141 can be heated so that roller 131 can also shape and mold the exterior and sides of strip 141 to the desired shape. One example of materials that can be used for strips 140 and 141 can comprise a polypropylene, or polyurethane, based polymer blend for matrix 143 in strip 140 and a polypropylene, or polyurethane, based composite for wear strip 141, respectfully, to allow thermal bonding (fusing) of the two strips. Another example of materials can comprise a polyurethane based blend for matrix 143 of strip 140 and a PET polymer for wear strip 141, with adhesive used to achieve bonding between the two strips. The reader should note that there is nearly an endless number of combinations for strip 140 and strip 141 materials that could be used with thermal and adhesive bonding since each family of polymers can have dozens of different formulations. In fact, wear strip 141 can be co-extruded and/or molded as part of polymer strip 140, eliminating the need for a separate strip 141. With this method, wear strip 141 and matrix 143 may be, or may not be made of the same material.

In FIG. 1, manufacturing equipment 100 shows multiple steps in building finished conduit 158. Specifically these steps comprise: 1) bending wire 110 into a coiled tension spring, 2) expanding the coils to the correct coil pitch, 3) wrapping reinforced strip 140 on coils 110, 4) bonding the strip together to form a conduit, and 5) bonding a valley reinforcement cord 155 in the valley of the hose. Notice that the construction of strip 140 and use of step 5) are the novel and unobvious components of making hose 158.

In FIGS. 1, 2, 4, 5, 7 and 8, valley reinforcement cord 155 is seen being wrapped onto its respective conduit near the center between the wire coils. Tension on cord 155 pulls the other hose structure toward the center of the valley (in toward the axis of the hose) to the desired radius. Because the radius of cord 155 is significantly smaller than the radius of coiled wire 110, cord 155 is effectively trapped in the valley of the conduit whether bonded or not bonded to the exterior of the hose. Cord 155 can be coated with a polymer or an adhesive to allow it to bond to matrix material 143 and 143*a-b*, and thus integrate it with the conduit. In FIG. 1, cord 155 can be coated with polymer matrix 143, or other compatible polymer, so that heater 151*a* can melt the polymer and prepare cord 155 for thermal bonding to strip 140 in valley 124*a*. Note that additional heaters can be used to heat strip 140 at the bottom of the valley for better bonding of reinforcement cord 155. In FIG. 2, cord 155 is heated by heater 151*a* to prepare cord 155 for bonding to strip 140*c* at the bottom of v-shaped valley 124*a*. In FIG. 4, cord 155 is heated by heater 151*b* to prepare cord 155 for bonding to strip 143*b* at the bottom of valley 124*a*. In FIG. 5, cord 155 is heated by heater 151*c* to prepare cord 155 for bonding between strips 143*a* and 143*b* with cord 155 wrapped over bidirectional reinforcement 140*k*. In FIG. 7, cord 155 is heated by heater 151*a* to prepare cord 155 for bonding to reinforced hose body 200 at the bottom of valley 124*a*. In FIG. 8, cord 155 assists cords 252 and 254 in maintaining the valley shape, and providing additional radial support against internal pressure. While the use of adhesives is not shown in these drawings, the art of applying adhesive in continuously manufactured products is a well developed science, and can be used with any of the manufacturing processes discussed in this document.

In FIGS. 1, 2, 4, 5, 6, 7 and 8, valley reinforcement cord 155 provides a number of non-obvious benefits. First, cord 155 can create and stabilize the v-shaped valley. The advantages of the v-shape is not obvious at first, since most non-reinforced stretch hoses have a wide u-shape valley and work fine with this shape. However, when bidirectional reinforcement is integrated into a convoluted hose body, the hose body can no longer stretch like an unreinforced hose, and the wide u-shaped valley of prior art designs tend to cause more binding when retracting. Second, the wide u-shaped valley of prior art significantly increases stress in the reinforcement at the coiled wire due to the larger off-axis angle there. The sharp u-shaped or v-shaped valley created by the valley reinforcement 155, reduces this angle and thus gives the bidirectional reinforcement (cords 142 and 144) greater mechanical advantage against longitudinal forces (pulling on hose forces). Thus, the valley reinforcement also significantly increases the effective longitudinal strength of the hose. Third, reinforcement cord 155 also maintains the valley depth even when the hose is subjected to high temperatures where reinforcement fibers might shift and change the shape of the hose. Cord 155 insures that the valley is maintained both during and after use. And fourth, reinforcement cord 155 provides additional pressure strength for the hose by transferring some of the radial pressure tension in the bidirectional reinforcement (cords 142 and 144) to cord 155. Thus, valley reinforcement cord 155 provides many functions.

FIG. 1A shows a section of strip 140 before being heated and wrapped onto wire 110. FIG. 1B, shows the approximate shape and orientation of the cords of the same section of strip 140 seen in FIG. 1A after it has been stretched onto wire 110 and mandrel 120. Note that to actually be wrapped onto mandrel 120 and coiled wire 110, the section of strip shown in FIG. 1B could not be laid flat anymore, thus FIG. 1B shows an approximation of what the section would look like if you could flatten it out. Notice that cords 142 and 144 change orientations to allow strip 140 to differentially stretch instead of actually stretching cords 142 and 144. To effectively allow this shifting of the cords in a woven fabric, cord angles 148*a* and 148*b* of cords 142 and 144, respectively, should be at least thirty degrees to allow the desired indentation shape 124*a* and no greater than eighty degrees so that enough strength is provided along the longitudinal axis 145 of the strip. Angles smaller than thirty degrees could be used for angles 148*a* and 148*b*, but the maximum depth possible for indentation 124*a* would be reduced and this could adversely effect the retracting ability of finished conduit 158. Optimally, angles 148*a* and 148*b* should be larger than forty degrees to provide a larger indentation (valley 124 or 124*a*) between the coils of wire 110. This provides the ability of the cords to tilt toward the longitudinal direction when the edge areas 152*a* and 152*b* are stretched (see FIG. 1B). Larger angles for 148*a* and 148*b* can be used, but as these angles grow larger than seventy degrees, cords 142 and 144 become more and more aligned transversely, and thus provide less and less reinforcing in the longitudinal direction 145 of the strip. Since the hoop stress on a cylindrical pressure conduit is twice the longitudinal stress for the same conduit, the hoop strength is very important. Thus, the longitudinal strength of strip 140 (direction 145) could be compromised by making angles 148*a-b* much larger than seventy degrees before stretching and sixty-five degrees after stretched on the conduit. Note that the longitudinal direction 145 for strip 140 when laid onto the conduit is oriented substantially in the direction of the hoop stress of finished conduit 158 (strip 140 laid substantially perpendicular to the longitudinal direction 147 of the finished hose 158). Likewise, the transverse direction of strip 140 (perpendicular to direction 145) is laid substantially in the longitudinal direction 147 of finished conduit 158. This means that when strip 140 is wrapped on coiled wire 110, cords 142 provide most of the hoop strength, and cords 144 provide most of the longitudinal strength.

In FIG. 1B, we see what the section of strip 140 seen in FIG. 1A might look like after it has been stretched onto coiled wire 110. Note that the larger diameter sections of the conduit near the wire have been stretched longitudinally to compensate for the larger distance and larger circumference at that portion of the conduit. This is in contrast to the shorter distance around the circumference of the valley of the conduit near the center region of strip 140 and between the wire coils. Thus, after being stretched around mandrel 120 and coiled wire 110, reinforced polymer strip 140 can be substantially un-stretched near the midline of the strip (center of transverse portion 154), while the edges of strip 140 (transverse portion 152*a-b*) are stretched significantly by the difference in linear velocity between the rotating coiled wire 110 and tensioning rollers 150. In other words, the exterior speed of coiled wire 110 is set significantly larger than the exterior speed of tensioning rollers 150, assuming strip 140 is not slipping as it passes through rollers 150. Notice in FIG. 1B that strip 140 has stunk transversely as it has stretched. The dashed lines show the original width of strip 140. The larger the cord angles 148*a-b* the less transverse contraction that is needed to provide the shown stretch. As cord angles 148*a-b* near thirty degrees the strip can stretch by less than ten percent, while an unreasonable amount of transverse shrinkage can occur. For deep valley portions 124, angles 148*a-b* can be made greater than forty-five degrees so that the needed longitudinal stretching can be achieved. These larger angles also reduce the changes in the transverse width of strip 140 while differentially stretching.

In FIG. 1C, we see polymer strip 140 in a section view, showing the cross-section along a line cut transversely through strip 140 (see FIG. 1). Fiber cords 142 and 144 are woven in and out of each other, but only their ends are shown in this section view. Matrix 143 is bonded to and/or surrounding fiber cords 142 and 144 to form a composite strip. Fiber cords 142 and 144 form a woven fabric in this example, but may alternatively be layered as separately oriented sheets that are fused together (see FIG. 1C), or two layers each with one of the fiber cord orientations bonded together. The thickness of polymer strip 140 is exaggerated in FIG. 1C in order to show detail. In actual practice, strip 140 can be approximately 0.005 inches to 0.050 inches thick, and 0.5 inches to 1.5 inches wide for a single layer one inch diameter hose. The actual chosen dimensions for the strip depend on many factors including whether a single layer or double layer of strip is being wrapped, the operating conditions for the conduit (i.e. pressure rating), diameter of the conduit, the pitch between wire coils, and etc. The woven layer of cords 142 and 144 are shown here near the center of strip 140 (and matrix 143) to provide maximum flexibility. This type of strip material can be used with any number of conduit making machines including, but not limited to, the conduit making machines shown in this document.

In FIG. 1D, we see a top view of the alternate knitted reinforced strip material 140a. Strip 140a comprises a weft knit fabric 142a encapsulated in the matrix material 143, with yarn (cord) reinforcement 142b woven within or bonded to fabric 142a. Knitted fabric 142a and reinforcement 142b can each comprise fiber cords similar to cords 142 and 144 discussed previously. Reinforcement 142b is substantially aligned with the longitudinal direction 145 of strip material 140a. Cords 142b limit longitudinal stretch of fabric 142a in the center portion of strip 140a and provide valley reinforcement for the finished hose when used in a convoluted hose making machine, such as machine 100. Strip 140a is designed to be wrapped onto a convoluted hose with cords 142b positioned in the center of the valley of the conduit. This type of strip material can be used with any number of conduit making machines including, but not limited to, the conduit making machines shown in this document.

In FIG. 1E, we see a top view of warp knitted reinforced strip material 140b. Strip 140b comprises a warp knit fabric 142c encapsulated in the matrix material 143. Section 142d can be knitted as part of fabric 142c and has significantly less stretch in the longitudinal direction 145 than other portions of knitted fabric 142c. Knitted fabric 142c and low-stretch reinforced section 142d can each comprise fiber cords similar to cords 142 and 144. Reinforcement section 142d is substantially aligned with the longitudinal direction 145 of strip material 140b and performs the valley reinforcement function similar to valley forming reinforcement cords 142b and 155 because of the low stretch properties center section 142d. Strip 140b is designed to be wrapped onto a convoluted hose with section 142d positioned in the center of the valley of the conduit. This type of strip material can be used with any number of conduit making machines including, but not limited to, the conduit making machines shown in this document.
Example Conduit Making Machine 100a—FIGS. 2 Through 2B In FIG. 2, we see a second example of valley shaping reinforcement 155 used with a continuous conduit making machine 100a. Conduit making machine 100a is designed for making finished conduit 158a by bonding fiber reinforced strip 140c to itself at helical bonding zone 157, which is positioned at the bottom of valley portion 124a between the coils of wire 110. In this example, valley shaping reinforcement 155 is wound in the valley on top of bonding zone 157. The final hose 158a is very similar to finished hose 158 seen in FIG. 1, except that the seam of the hose is in the valley instead of at the crest of the convoluted hose. In FIG. 2, reinforcement 155 serves the same function as it did in FIG. 1.

In FIG. 2, conduit making machine 100a comprises wire bending machine 105, roller mandrel 120a, heaters 151 and 151a, rollers 150 and 150a, roller(s) 180, and roller(s) 180a. Heater 151 is used in this case instead of heater 161 because machine 100a is using strip 140c for conduit construction. Heater 151 can be used in FIG. 2, because strip 140c is very similar in properties to strip 140, with the only difference being that cords 142 and 144 are laid in two separate layers in strip 140c, but are woven in strip 140. The section view of strips 140 and 140c can look identical. However, when tensioned, strip 140c can behave quite differently than strip 140. Thus, tensioning rollers 150 can be adjusted to provide the proper tensioning for strip 140c. Heater 151 is adjusted to properly melt reinforced polymer strip 140c so that it can be differentially stretched onto wire 110 and around mandrel 120a. As mentioned before heater 151 can include heaters on both the bottom (shown) and top (not shown), and can comprise additional heaters near the actual overlap location.

In FIG. 2, rotating rod mandrel 120a comprises, a center rod 123 with a straight portion 123a, a valley forming portion 124a and ridge forming portion 125, and four rotatable rods 122a-d. Center rod 123 is stationary and is mounted in the center of the four rotatable rods 122a-d. Center rod 123 can be mounted to wire bending machine 105 or other solid structure. Rods 122a-d are motor driven (not shown) and designed to rotate coiled wire 110 around mandrel 120a, and provide a surface for applying pressure to hose strip 140c for bonded at roller(s) 180 and 180a. If FIG. 2, we see that center rod 123 can continue past the end of rods 122a-d and take on a convoluted shape with a valley portion 124a and a ridge portion 125 which allows v-shaped roller 185 on roller assembly 180 to help form the v-shaped valley and to bond cord 155 to the hose. Tension on reinforcement cord 155 from rollers 150a also assist in shaping strip 140c to form the desired v-shaped valley. The convoluted portion of center rod 123 is designed to provides a stable platform for shaping v-shaped valley. Also notice that rotating mandrel system 120a can be used to make hose with the bond zone at the top of the ridge like hose 158 seen in FIG. 1, and is not limited to just the strip materials discussed within this document.

In FIG. 2 we see that strip 140c is stretched differently than strip 140 seen in FIG. 1. Strip 140c is stretched near its centerline (transverse portion 154) while strip 140 is stretched near its edges (transverse portions 152a-b). This is because wire 110 is aligned near the center of strip 140c in this example (see FIGS. 1 and 2 for comparison). Because the center of strip 140c is stretched onto wire 110, the edges of strip 140c must be bonded near the valley portion 124a between the coils. Optional heat guards 159a-b can be used to reduce heating to the edges of strip 140c to prevent significant stretching of edge portions 152a-b. Heat guards 159a-b allow heating toward the end of heater 151, to allow the outer surface of strip 140c to be heated for bonding. Heater 151 can be placed closer to mandrel 120a than shown to facilitate heating the inner surface of edge 152b and outer surface of edge 152a as it rotate around the mandrel. This helps heat the edge surfaces of strip 140c while still allowing a heat bonded seam. Additional heaters can be used to heat the strip after it is stretched (i.e. rollers 184 can be heated). The overlap portion 157 of strip 140c is shown in FIG. 2, and extends along a spiral path, the full length of the conduit. In alternative constructions, adhesives can be used to bond the edges of strip 140c together. Also, strip 140c can be replaced by many of the other differentially stretchable strips, such as, strips 140, 140d, 140e, 140k, 143a, 143b, as well as, extruded strips 143d, or 143e, depending on the final use of the hose.

In FIG. 2, roller assembly 180 comprises shaft 182 and rollers 183, 184, and 185 mounted on shaft 182. The contact surface of rollers 183, 184 and 185 can be textured to improve grip against strip 140c and can be powered to turn at the same rate as strip 140c to help motivate the strip to rotate with wire 110. Additional roller assemblies similar to assembly 180 can be used, if needed, and may be mounted all the way around mandrel 120a. After the second roller assembly 180a, finished conduit 158a is allowed to cool and then retract to its minimum length (retracted length). Conduit 158a is shown fully retracted at section 170 after coming off of mandrel 120a. Care must be taken to allow strip 140c to cool sufficiently on the conduit before full retractions of the hose, otherwise the strip 140c material could still be hot enough to bond to adjacent coils if pressed together by spring wire 110. In an actual conduit making machine, pullers would keep conduit 158a stretched for a distance after leaving mandrel 120a to allow it to cool sufficiently to allow reinforced strip 140c to stabilize its extended shape. The retracted section 170 of conduit 158a is its normal relaxed state, with coiled spring wire 110 strongly tending to retract the conduit even when fully retracted as shown in section 170. This retracting ability is common to all conduits made by the conduit making machines disclosed in this patent.

In FIG. 2A we see a portion of strip 140c before being stretched onto wire 110. In FIG. 2B we see the same portion of strip 140c seen in FIG. 2A after it is stretched onto coiled wire 110 and forms a three-dimensional curved shape. Strip 140 would stretch in a similar manner if used on conduit making machine 100a. Notice that the stretched strip portion shown in FIG. 2B only approximately shows the three-dimensional deformation that occurs in strip 140c as it is stretched onto mandrel 120a of conduit machine 100a. Diagonal cords 142 and 144 do not stretch when matrix 143 stretches, but the angle of cords 142 and 144 changes to allow the central portion (transverse portion 154) of strip 140c to stretch while the edge portions (152a-b) stretch significantly less. Again, the new position of cords 142 and 144 seen in FIG. 2B is only approximate and is only designed to convey how the cords move to allow differential stretching of strip 140c in this design.

In FIG. 2C, we see a top view of the alternate knitted reinforced strip material 140d. Strip 140d comprises a knit fabric 142e encapsulated in the matrix material 143. Within knitted fabric 142e are reinforced knitted sections 142f that have very low stretch in the longitudinal direction 145. Knitted fabric 142e and reinforced sections 142f can each comprise fiber cords similar to cords 142 and 144. Fabric 142e and sections 142f can be formed with the same cords (i.e. cords 142) where section 142f would be knitted with a different low stretch patterns compared to the rest of fabric 142e. Strip 140d is designed to be wrapped by hose making machine 100a to form a convoluted hose with sections 142f positioned substantially in the center of the valley of the conduit. Sections 142f limit the longitudinal stretch of strip 140d in those portions of the strip and assist conduit making machine 100a in forming the needed valley at the edges of strip 140d. Sections 142f also serves as a valley reinforcement similar to valley reinforcement cord 155, but is part of the knitted structure of fabric 142e. Strip 140d is another example of how valley reinforcement can be applied in alternate ways.

The reader should understand that the disclosed manufacturing example in FIGS. 1 and 2 can easily be extended to provide additional layering of material on the conduit being manufactured simply by extending the length of mandrel 120 and 120a to providing space for additional sheet material(s) to be rapped on the hose (i.e. extra wear strips, additional coverings or other applied layers, labeling, etc.).

In FIG. 2D we see a transverse section view of differentially stretchable strip 140e, comprising a polymer matrix material surrounding diagonally woven cords 142 and 144. The construction of cords 142 and 144 in strip 140e can be identical to those seen in strip 140 or 140c. Strip 140e however is designed to wrap over two wire coil sections at time and is thus approximately twice as wide as strips 140 and 140c. Strip 140e can also be half as thick as strips 140 and 140c since it will be wrapped onto the conduit in a double thickness. In this particular strip design, the woven cords 142 and 144 are bonded near the top surface of polymer layer 143, but in other designs the cords can be placed in the middle of polymer matrix 143. Cords 142 and 144 can also be replaced with cords that have half the density since two layers of cords will cover each section of hose (double layer with some overlap at edges for three layers in bond zone 156, see FIG. 1). The double layer structure of the resulting hose provides greater resistance the seam between wrappings to come apart since the reinforcement cords 142 and 144 overlap an entire coil width on the hose. Strip 140e can be used with the other conduit making machines just like strips 140 and 140c.

Example Conduit Making Machine 100b—FIG. 3

In FIG. 3, conduit making machine 100b for making a double reinforce conduit 158b. Conduit making machine 100b shows an example of additional reinforcing cords 270a-d being used to radially reinforce and shape hose 158b, and using cords 270d as valley reinforcement at the bottom of the valley. Cords 270a-d are bonded over bonded strip 140 and longitudinal cords 272. This example shows how the shape of the valley can be controlled by more than one valley reinforcement cord at the bottom of the valley. In alternate designs, additional polymer layer(s) may be bonded over reinforcing cords 270a-d and 272 to hide this cord structure. In FIG. 3, longitudinal cords 272 and radial cords 270a-d are positioned with a small space between them to provide added burst strength without significantly stiffening the body of the conduit. Machine 100b comprises the previously mentioned conduit making machine 100, with some modifications to the roller arrangement and of course the valley reinforcement. Note that the wear strip equipment (see FIG. 4) could have been easily added to an extended mandrel, but has be omitted to fit the drawing on the page.

In FIG. 3, conduit making machine 100b comprises the previously discussed wire coiling machine 105, mandrel 120, two bonding roller assemblies 130, tensioning rollers 150, and heater 151, along with the new components, heater 151b, friction tensioning bar 150b, radial cord guide 276, which guide radial cords 270a-d, and longitudinal cord guide 278 (sometimes called a nose ring) which guides longitudinal cords 272 onto the conduit. Notice that conduit making machine 100b has the main components of conduit making machine 100 with the addition of a bonding system for bonding cords 270a-d and 272 to the exterior of the conduit to provide added pressure strength and longitudinal strength without significant increasing the stiffness to the body of the conduit (strip 140). Thus, cords 270a-d and 272 still allow easy retraction and extension of the conduit. Cords 272 can be polymer coated fibers and/or uncoated fibers depending on the conduit construction. If uncoated yarn is used for cords 272 coated cords 270a-d can have sufficient polymer to bond to strip 140 between cords 272. Also notice that wire coil bending machine 105a can easily be substituted for coil bending machine 105. Cords 270d provide the bottom valley reinforcement to provide a v-shaped valley. The other cords 270a-c provide additional support and can be used to further define the shape of the valley.

In FIG. 3, the mechanism for applying reinforcing cords 270a-d and 272 comprises friction tensioning bar 150b, guide 276, ring guide 278, and heater 151b. Reinforcing cords 270a-d and 272 can comprise any high tensile strength fiber similar to those discussed for cords 142 and 144. Cords 272 do not have to have the same composition as cords 270a-d. In fact, each of the cords 270a-d may all be different sizes and/or composition as needed for a particular conduit function. In particular designs, all of cords 272 and 270a-d can be the same. In most examples, cords 270a-d and 272 will only be a few thousandths of an inch thick and several times wider than it is thick after being laid on the hose. Thus, cords 270a-d and 272 can have the shape of a flat strip after being wrapped onto the exterior of the conduit. Cords 270a-d and 272 may have this flat profile before entering machine 100b, as seen in FIG. 3A, or can be given this shape after heating and bonding to strip 140. While a flat profile is desirable, the system will still work with more symmetric cords, such as, circular cross-section cords.

In FIG. 3A, we see the structure of cords 270a-d in section view comprising many micro-fibers 274 bonded within a polymer matrix 275. Fibers 274 and matrix 275 are chosen so that they can be bonded to each other. That is, fibers 274 do not easily delaminate from matrix 275. Matrix 275 also holds micro fibers 274 together to form a single cord, and preferably bonds strongly to fibers 274. Polymer matrix 275 is also chosen so that it can be strongly bonded to strip 140 (bond to polymer material 143 on the exterior of strip 140), either by melt bonding, adhesive bonding, solvent bonding or other bonding methods.

In FIG. 3, circular guide 278 comprises a circular body that extends around mandrel 120 and can be attached to a hose wrapping machine (not shown) for rotating spools of cords 272 (not shown) around the mandrel in direction 146a. Prior art spiral reinforcement wrapping machines are a standard component in the hose manufacturing industry for applying spiral wrapped reinforcement onto conduits. These prior art wrapping machines, however, are designed to wrap the reinforcement onto a non-rotating hose. In contrast conduit 158b is rotated during manufacturing by conduit making machine 100b, so that the wrapping angle can be controlled by the difference between the rotational speed 146 of hose 158b and rotational speed 146a of cords 272. Arrows 273 show the direction of linear motion of cords 272 and arrow 146a shows the rotational direction and relative rotational speed of cords 272. Notice that in this example the rotational speed of cords 272 and hose 158b are shown as approximately equal. With rotation speeds 146 and 146a the same, cords 272 will be laid substantially lengthwise (longitudinally) along the hose as shown. Circular guide 278 can comprise individual guides for each cord 272 instead of notches. Alternatively, circular guide 278 can be a smooth stationary ring like guide ring 279 (see FIG. 6) so that cords 272 are guided by sliding along the inside surface of the smooth stationary ring. If cord guide 277 encompasses the conduit and is designed to guide cords 272 properly, then guide 278 could be eliminated. Similarly, the proper design of guide ring 278 can eliminate the need for guide 277. In FIG. 3, guide 278 rotates with coiled wire 110 and strip 140 so that cords 272 are positioned (bonded) longitudinally onto the conduit formed by strip 140 (direction 147). It can be desirable for cords 272 and guide 278 to rotate at speeds different than coiled wire 110 so that cords 272 can spiral around the finished conduit formed by polymer strip 140 at a predetermined rate and direction. For example, if cords 272 are rotated faster than coiled wire 110, cords 272 will wrap around the conduit with a right-handed spiral, which is in the opposite direction as wire coil 110. This right-handed spiral, thus can provide a resistance against left-handed wire coil 110 to reduce twisting along the longitudinal axis of hose 158b when pressurized. Rotating cords 272 faster than wire 110 can also place cords 272 closer to perpendicular to cords 270a-d. Rotating cords 272 slower than wire 110 causes cords 272 to wrap around the conduit with a left-handed spiral (see cords 254 on wrapping machine 250b).

In FIG. 3, stationary cord guide 276 comprises guide notches or eyelets for guiding cords 270a through 270d over cords 272 and strip 140. Cords 270a-d are fed from spindle or spools (not shown) and tensioning systems (not shown) as is normal for cord or yarn feeding and wrapping systems. Because guide 276 does not move, the cord feeding system can comprise an industry standard rack of spindles (spools) to feeding guide 276. Friction tensioning bar 150b is shown as a metal bar structure for providing friction and tension to cords 270a-d, and can comprise one or more friction bars and/or eyelets for each cord to provide the desired individual friction and tension for each cord 270a-d. Alternative tensioning systems can comprise a significantly more complex system than shown here with rollers and/or spring tensioning systems as is common in the textile industry. Cords 270a-d are laid over cords 272 so that longitudinal tension in cords 272 does not cause them to tear away from the valley portion of strip 140. Cords 270a-d go onto the conduit at different speeds. Cord 270a is the fastest, while cords 270b are the next fastest, cords 270c are the next fastest and cords 270d are the slowest. The relative speed of each cord is shown approximately by the length of arrows 271 at the end of its respective cord. Notice that the left-most cord 270b must compress all the cords 272 against strip 140. Optionally, cord guide 277 can be positioned to follow near the path of the left-most cord 270b and pre-compress cords 272 near the conduit surface to help relieve some of the stress on cord 270b. Cord guide 277 is shown attached to guide 276, but can be attached anywhere a stable mounting bracket is available, such as, on guide 278 and/or heater 151b.

In FIG. 3, each radial cord 270a-d is moving at a different rate to match the speed of strip 140 at that radius. Rollers can be used (see roller 160 in FIG. 8) to help press together these cords and strip material 140. Special roller assemblies like roller assembly 160 can be used that have separate sections that can each rotate at a different rate to match the rate of its respective cord. Many additional cords, in both the longitudinal and radial directions, might be use if large hose diameters are created.

In FIG. 3A, we see a section view of cords 270a through 270d, which have similar construction. Multiple micro fibers 274 run longitudinally though cords 270a-d, incased in a polymer matrix 275. Cords 270a-d have an elongated rectangular shape in this example to attach flat onto conduit strip material 140 and provide a low profile reinforcement. Polymer matrix material 275 can comprise any number of polymers including, but not limited to, the polymers discussed for matrix 143, and 143a-b. Fiber reinforcement strands 274 can comprise any number of high strength fibers, including, but not limited to, those fiber materials discussed for cords 142, 144, 142a-f.

Example Conduit Making Machine 100c—FIG. 4

In FIG. 4, we see conduit making machine 100c using the disclosed valley reinforcement cord 155 with composite strip 140g. Cord 155 is wrapped on top of elastomer layer 143b with reinforcement layer 140f and elastomer layer 143a below it. Reinforcement 140f is thus, sandwiched between strips 143a and 143b with cord 155 on top in the finished hose. Through the application of heat and pressure elastomer layers 143a-b are bonded together through the mesh layer 140f to form a reinforced convoluted conduit. Cord 155 holds all these layers down in the valley of the hose and gives finished hose 158d a stable v-shaped valley.

In FIG. 4, conduit making machine 100c comprises wire coiling machine 105, mandrel 120b, tensioning rollers 150a and 150c, heaters 151a and 151b, heater shields 159 and 159c, roller assembly 130, roller assembly 130a and forming roller 131 for making a finished conduit 158c. Coiling machine 105, mandrel 120b, rollers 150a, heater 151a, and roller assemblies 130 and 130a are substantially the same as seen in FIG. 1. Modifications to these systems can be done to optimize conduit making machine 100c for wrapping composite strip 140g onto mandrel 120b. Rollers 150c, and heater 151b has been added to allow construction of conduit 158c in this way. These components are designed to heat strips 143a-b and 140f at the same time so that it can differentially stretch as a unit over coiled wire 110 and mandrel 120b. Strip 140g is composed of three separate strips 143a, 140f, and 143b that are bonded together prior to entering conduit making machine 100c. Strip 140f can be designed to extend across the entire width of composite strip 140g so that the reinforcement in strip 140f has a larger overlap region. Strips 143a-b can be composed of the same polymer as matrix material 143 seen in strip 140. Cords 142 and 144 in reinforcing strip 140f can be made of the same materials as the cords 142 and 144 seen in strip 140, but without matrix 143 molded around them or possibly a small amount of matrix 143 or other polymer molded around the cords. Cords 142 and 144 are embedded into the top surface of strip 143a and the bottom surface of strip 143b. In FIGS. 4 and 5, reinforcing mesh strip 140f is shown with an open mesh structure which can be woven or non-woven. The density of cords 142 and 144 will depend on the type of conduit being made and what it will be used for. In many uses, strip 140f can be a woven fabric to provide high strength. In other applications strip 140f can be an open mesh as shown (either woven mesh or non-woven mesh).

Heat shields 159 are positioned between heater 151b and the center of strips 143a and 143b to protect the transverse portion of those strips from heating to a temperature near their deflection temperature. Reinforcing strip 140f may not require a heat guard since cords 142 and 144 have a much higher melting temperature than strips 143a-b, but depending on the conduit being made and the density of cords 142 and 144 it may be required to protect the small cords from overheating during heating of strips 143a-b.

Rollers 132 and 134 are used to press composite strip 140g against itself to bond it into a sealed conduit. Specifically, the first roller 134 on the left is designed to press the right edge of strip 143a against the left edge of itself (strip 143a) to form the innermost layer of conduit 158c. The second roller (roller 132) is designed to press the left edge of strip 143b against the left edge of strip 140f and the right edge of strip 143a below it. This places strip 140f on top of strip 143a and below strip 143b, and places reinforcement strip 140f sandwiched between strips 143a and 143b. Roller 132 is also designed to press the right edge of polymer strip 143b down through strip 140f and onto the right edge of strip 143a, to create a bond between strip 143a and 143b. The first roller 132 on assembly 130a is designed to press the left edge of strip 143b again to insure strip 143b is bonded to strip 143a through the two edges of strip 140f. The second roller 132 on assembly 130a (right most roller 132) is designed to continue pressing hot strip 143b down through cords 142 and 144 and into strip material 143a, locking the two edges of reinforcing strip 140f together at the seam 156 and provide a reinforcing layer within conduit 158c. The right most roller 132 finishes the hose structure by pressing the right edge of strip 143b against the left edge of strip 143b to bond it to itself at bond zone 156 and forming a sealed exterior layer on conduit 158c. The process is designed to provide the hose with distinct layers in the conduit: 1) An interior layer made of strip 143a, 2) a central layer made of reinforcing strip 140f, and 3) an exterior layer made of strip 143b. Additional rollers can be used to provide better bonding of the layers by pressing the strips together in the v-shaped valley portion 124a of mandrel 120b. Valley forming cord 155 is wrapped on with strip 143b and assists in pulling all three layers into the desired v-shape. Composite strip 140g is shown here as formed separate from conduit making machine 100c, but one could just as easily bring the three strips 143a, 140f, and 143a together as they are wrapped onto mandrel 120b (see FIG. 5, strips separately, not molded overlapping each other as in FIG. 4).

In FIG. 4A, we see a section view of composite strip 140i with edge views of strips 143a, 140j and 143b. Notice that strip 140i is very similar to composite strip 140g seen in FIG. 4. The only difference between strips 140g and 140i is that the center mesh 140j in strip 140i is coated with a polymer to hold the mesh cords 142 and 144 together. During manufacturing strips 140g and 140i behave approximately the same, though strip 140i can be easier to bond together with strips 143a-b. Strip materials 143a and 143b can be made of a flexible polymer similar to matrix 143. Bidirectional reinforcement strip 140j comprises woven or layered (see FIG. 5A) cords 142 and 144 that can be coated or encapsulated within a polymer matrix. Strip 140j is bonded between strips 143a-b. The angle of cords 142 and 144 within this arrangement can be the same as in strip 140 or any of the other bidirectional weave and knit reinforcement presented here to provide differential stretching of different transverse portions. A stabilizing reinforcement 155 can be bonded along the center of reinforcing strip 143b as shown, or along the center of reinforcement strip 140j to substantially prevent the center of strip 140j from stretching during heating and molding of composite strip 140i. Reinforcement 155 can be cords similar to cords 142 and 144 with matrix material 143, or 143a-d, binding the fibers within the cords together. In this way, reinforcement 155 can be coated to keep water way from the high-strength fibers within the cord. In alternate designs, cord 155 may be uncoated. With other bonding methods, such as adhesives, reinforcement 155 can be nearly any material that is somewhat flexible. Alternatively, reinforcement 155 can be made of the same materials as cords 142 and/or cords 144 and woven or bonded to strip 140j near its center along its longitudinal axis (see FIG. 5). This causes the center portion of strip 140j to be stretched down into valley 124a and form the desired convoluted helical shape. Valley reinforcement 155 insures that the valley is properly formed in the bidirectional reinforcement formed on the hose and that the valley will not deform permanently from high temperature use.

In FIG. 4B, we see a transverse section view of strip 140h comprising reinforcing cords 142 and 144 pressed into a double wide strip (two wire coils wide strip) of matrix 143 and valley forming reinforcement cord 155. Cords 142 and 144 can be woven or non-woven depending on the final product desired. Strip 140h would be wrap by conduit making machine 100c the same way as strip 140g. However, strip 140h is designed to be wrapped two layers thick. Thus, strip 140h wraps onto coiled wire 110 such that each side edge wraps over three wire coils, one coil on each end and one wire coil at its center. Guides can be used to guide strip 140h onto wire 110 so that it is aligned with the coils. Three heat guards (heat guards 159 and center heat guard 159*c*) can be used to protect the valley portions of matrix material 143 in strip 140*h* from heating to its deformation temperature. This protection reduces softening of matrix material 143 in the valley portions of reinforced strip 140*h* and thus helps form the v-shape of the valley portion of the conduit. Strip 140*h* when wrapped by conduit making machine 100*c* will produce a conduit substantially different in structure than the conduit made with reinforced strip 140*g*. Strip 140*h* will produce a double layer hose where each layer comprises a layer of matrix material 143 and a layer of woven cords 142 and 144. This provides a double layer structure except at the bond zone 156 (at the wire ridge area) where three layers are melted and bonded together. Reinforcement cord 155 is positioned in the valley portion of the strip and provides essentially no stretch when wrapped on mandrel 120*b*. Thus, cord 155 insures that strip 140*h* is pulled down into the v-shaped valley desired, and also insures that valley will not deform significantly over the life of the hose.

Strip 140*h* has reinforcing fibers 142 and 144 substantially along its entire top surface. Fibers 142 and 144 in strip 140*h* are preferably woven, but can be non-woven if desired. The dimensions of strip 140*h* is approximately twice the wide and half the thickness of strip 140. This allows strip 140*h* to be applied in two layers overlap to produce a conduit with at wall thickness that is approximately the same as conduit 158, which is made with strip 140 wrapped on as a single layer (see FIG. 1). If strip 140*h* were made three times as wide as strip 140 then a thickness of one-third might be used to produce similar wall thicknesses by wrapping three layers thick.

Notice that in FIGS. 4, 4A and 4B, strips 140*g*, 140*i* and 140*h*, respectfully, can be constructed to have about one-half the thickness or less of the other strips presented in this patent (see strips 140, and 140*c*). Strips 140*g* and 140*i* produce a three-layer conduit, while strip 140*h* produces a substantially four-layer conduit (two layers of reinforcement/polymer 143). Even with this different structure, strips 140*g* and 140*i* can form a final conduit structure that is similar to conduits formed by strips 140 and 140*c* in FIGS. 1 and 2, respectfully.

Example Conduit Making Machine 100*d*—FIG. 5

In FIG. 5, we see conduit making machine 100*d* using valley forming reinforcement 155 to reinforce a conduit 158*d* by wrapping or bonding reinforcement 155 directly on top of bidirectional reinforcement strip 140*k*. Conduit making machine 100*d*, comprising wire coiling machine 105, mandrel 120*b*, three sets of tensioning rollers 150, heater 151*c*, three heat guards 159 and three sets of roller assemblies 130*a* for making a finished conduit 158*d*. Additional rollers and other guiding structures can be used to assist in guiding strips 143*a*, 140*k*, and 143*a* onto mandrel 120*b* and also assist in motivating them around the mandrel and also assist in insuring a consistent bond between strips 143*a*-*b* and mesh 140*k*. Conduit making machine 100*d* can also comprise strip guides if desired to help guide strips 143*a*, 140*k*, and 143*a* onto coiled wire 110. Strips 143*a*, 140*k* and 143*a* can be similar to the component strips 143*a*, 140*f*, and 143*a* seen in bonded strip 140*g* in FIG. 4. Notice that these three strips could be used with conduit making machine 100*c* in FIG. 4 to wrap the separate strips in the same positioning shown. The three strips bonded here form substantially the same conduit structure as conduit 158*c* in FIG. 4, minus wear strip 141. The reader should understand from the above description that the physical structure of finished conduit 158*d* can be substantially indistinguishable from conduit 158*c* seen in FIG. 4 except that reinforcement 155 is bonded under strip 143*b* instead of on top (wear strip 141 not considered). This is because strips 143*a*, 140*k*, and 143*a* are wrapped substantially in the same positions within conduit 158*c* as they are within conduit 158*d* by conduit making machines 100*c* and 100*d*, respectfully. Tensioning rollers 150, heat guards 159 and roller assemblies 130*a* have the same structure as in other examples presented here and provide similar functions. The tension on rollers 150 can be adjusted to a lower tension since strips 143*a*-*b* and 140*k* will generally be thinner than strip 140 for similar size conduits from other examples and will be easier to differentially stretch. Also the bonding zone can easily be moved to between the coils, with the use of different rollers (see roller 180 and 180*a* in FIG. 2).

In the process seen in both FIG. 4 and FIG. 5, the conduits produced have its layers (strip materials) bonded at the ridge at wire 110. In FIG. 4, valley reinforcement 155 is wrapped on top of strip material 143*b* providing a layer of polymer 143 between reinforcement 155 and bidirectional reinforcement strip 140*f*. This arrangement reduces wear between the fibers within reinforcement cord 155 and cords 142 and 144. In FIG. 5, valley reinforcement 155 is wrapped on top of bidirectional reinforcement 140*k* so that cord 155 lies almost directly on cords 142 and 144. This arrangement reduces the elastomer material between cords 142 and 144, and cord 155, making them act more as a single unit once strip 143*b* is bonded over and between them. In FIG. 5, strip 143*b* is wrapped on conduit 158*d* after valley forming reinforcement cord 155 is wrapped on and forms the desired valley. As such, strip 143*b* must wrap on and be formed close to the desired v-shaped valley without the aid of cord 155. Additional rollers like rollers 180 and 180*a* can be used to help form strip 143*b* into the valley formed by cord 155 and bond strip 143*b* through the reinforcements to strip 143*a*.

In FIG. 5A, we see a portion of an alternative non-woven reinforcing strip material 140*k* comprising fiber cords 142 and 144 and a thin layer of bonding matrix material 143*c* coating them and bonding them together. Material 143*c* can comprise the same materials that 143 is made of, or can be an adhesive, or be another polymer that can bond to both cords 142 onto 144, as well as, bond to strips 143*a* and 143*b*. Bonding matrix 143*c* can completely cover cords 142 and 144 as shown in FIG. 5A, or can be rolled on so that it exists mostly at the interface between cords 142 and 144. Non-woven strip 140*k* can substituted for woven mesh 140*f* in FIG. 4, with minor effect on the finished product. Matrix material 143*c* can be chosen to soften when heated by conduit making machine 100*d*, but not melt. In this way, strip reinforcement 140*k* can remain a structural mesh when heated and still easily differentially stretch. Matrix material 143*c* can also be used as an interface material to bond dissimilar cords within matrix material 143 or 143*a*-*b*. Thus, if one or both cords 142 and 144 can not be directly bond to matrix material 143 or 143*a*-*b*, coating them with matrix material 143*c*, as seen in reinforcement 140*k*, could allow them to be bonded. Valley forming reinforcement 155 can also be designed to bond to matrix material 143*c* to form a strong and stable bidirectional convoluted reinforcement.

The reader should understand that the design examples in FIGS. 1 through 8 can easily be modified to provide additional room for bonding additional layering of material(s) to the conduit. Specifically, a longer mandrel can provide space for additional wear strips and other coverings or other applied layers as desired.

Example Conduit Making Machine 100*e*—FIG. 6

In FIG. 6, we see conduit making machine 100*e* for making a bidirectionally reinforce conduit 158*e* with valley forming cords 142*b* acting to form a v-shaped valley similar to cord 155. In FIG. 6, conduit making machine 100*e*, comprises wire coiling machine 105a, mandrel 120, shaping roller assemblies 130 and 160, heater 151, heat guard 159 and cross extrusion head 310, and circular cord guide 279 for making a finished conduit 158e. Wire coiling machine 105a comprises one or more drive rollers 106 and one or more rollers 108. Mandrel 120 and roller assemblies 130 are the same as those discussed in FIGS. 1 and 3. Roller assembly 160 comprises a support shaft 164, and five roller surfaces 162a-e. Roller surfaces 162a and 162e can rotate with shaft 164 to provide motivation to rotating conduit 158e. Roller surfaces 162b-d can rotate freely with strip material 143d. Because of radius differences at different places in the valley of the hose the roller surfaces can rotate at different speeds. Roller surface 162c would rotate the slowest at the bottom of the valley, roller surfaces 162b and 162d would rotate slightly faster, and roller surfaces 162a and 162e would rotate the fastest. In alternate designs, all or some of the roller surfaces 162a-e can be powered or free to rotate. Additional rollers similar to roller assemblies 130 and 160 can be used to achieve the desired bonding pressure and time for strip 143d to bond to strip 143a to bond to one another. Notice that cords 142 help cords 142b to force strip 143a into a v-shaped valley and also hold the side walls of that v-shape better under pressure than without radial cords 142. As in other hose making processes within this document, strip 143a can be pre-made as shown here or extruded directly onto coated coiled wire 111. If directly extruded, strip 143a would not need heater 151 since it would already be in a heated deformable state from the extruder. Elastomer strips like strip 143a are commonly extruded in the hose industry (see strip 143e in FIG. 8) and also allows continuous operation.

In FIG. 6, crosshead extrusion nozzle (or die) 310 comprises a crosshead extrusion die, customized for this particular application. Extrusion die 310 can comprise an inlet port 314 for mounting to a polymer extruder (not shown), and a plurality of yarn ports 312 for accepting cords 142 and 142b into the extrusion nozzle. Nozzle 310 is designed to extrude reinforced strip 143d and encapsulate reinforcement cords 142 and 142b within the elastomer entering through port 314 under pressure. Arrow vectors 271 show the relative velocity of each cord 142 and 142b as it is wrapped differentially onto conduit 158e. The velocities of cords 142 and 142b can be controlled by speed controlled feeders (not shown) that are common to the textile industry. The number of cords and their denier of cords 142 and 142b can be adjusted depending on the conduit design. Longitudinal cords 272 and radial cords 142 and 142b can be standard uncoated textile yarn to reduce costs (such as nylon and/or polyester fiber yarn), but other strong fiber cords can be used. Cords 272 can bond to strip 143a, but because the two polymer strips 143a and 143d can bond to each other and surround cords 272, cords 272 do not necessarily need to bond to the polymer matrix in strips 143a and 143d. Alternatively, cords 272 can be coated with a polymer or adhesive before application if desired to facilitate bonding to strips 143a and 143d. Cords 272 are designed to rotate in the same direction 146a as conduit 158e during manufacture, so that cords 272 are wrapped onto the conduit with a strong longitudinal component. By adjusting the rotation speed 146a of cords 272, the angle of cords 272 can be adjusted with respect with longitudinal direction 147. If cords 272 rotate faster than conduit 158e (wire coil 111) then cords 272 will have a right-hand twist on the conduit. If cords 272 rotate slower than conduit 158e, then cords 272 will have a left-handed twist on the conduit. If cords 272 rotate at the same rate as conduit 158e (rotation 146a is the same as rotation 146) then cords 272 will be aligned in the longitudinal direction 147 on conduit 158e. Cords 142 and 142b hold cords 272 in place because of the geometry (cords 142 and 142b wrapped over cords 272), and also because strip 143a and strip 143d bond and trap the cords within the final convoluted structure. Roller surfaces 162a-e press on strip 143d to assist in pressing and bonding strip 143d to strip 143a beneath it.

In FIGS. 3 and 6, guide rings 278 and 279 can be stationary or rotating depending on the design. Since guide ring 279 in not rotating it is often called a nose ring, if it were rotating with cords 272 it is often called a yarn guide. Guide ring 279 is designed to guide cords 272 in toward conduit 158e for positioning the cords on the conduit. Normally, guide ring 279 will be stationary and cords 272 will slide around the guide ring during operation. Cords 272 can be rotated by standard reinforcement wrapping machine (not shown) which is common in the hose industry. Since guide ring 279 is not rotating it can be attached directly to extruder nozzle 310 if desired or to another support structure. If guide ring 279 were rotating it can be designed to rotate at the same speed as cords 272 and be attached to the same structure that holds the spools of rotating cords 272. Both rotating and non-rotating guide rings are common in the textile reinforcement industry.

Example Conduit Making Machine 100f—FIG. 7

In FIG. 7, we see conduit making machine 100f for making a bidirectionally reinforce conduit 158f with cords 142 and 144 acting as bidirectional reinforcement and cord 155 providing valley forming reinforcement. In FIG. 7, conduit making machine 100f, comprising a mandrel 120c, and one removable end connector 190, and a wrapping system comprising tensioning rollers 150a and 150b, a bonding heater 151, two bonding heaters 151a, and a bonding heater 151c. Additional tensioning rollers and heaters similar to those seen in previous presented conduit making machines can be used as needed. The wrapping process can be similar to prior art mandrel wrapping systems where a platform moves up and back along the rotating mandrel as strip materials are wrapped on the mandrel.

In FIG. 7, the mandrel system comprises hose forming mandrel 120c and removable connector 190. Mandrel 120c comprises a rod with convoluted valley 124a, a convoluted ridge 125, a mandrel end 127 and a connector post 128. The shape of mandrel 120c is designed to form the interior shape of conduit 158f. A groove at ridge 125 allows the wire to be held there during the production process. Connector end 190 comprise a support mount 192 for connecting to a rotary support and connector socket 194 for attachment to mandrel connector end 128. The exterior of connector 190 is sized to produce the desired hose end size so that a standard connector end can be mounted on the end of the hose. The exterior of mandrel end 127 is sized to produce the desired hose end interior size and also to provide a large enough diameter to allow that end of the hose to pass over ridges 125 during removal of the hose from mandrel 120c. For most production hoses and conduits, mandrel end 127 and the exterior of connector end 190 will have the same outside diameter, but nothing prevents their diameters from being different. Connector end 190 is designed so that socket 194 slides over connector end 128 and can be designed to allow rotational torque to be imparted to mandrel 120c or designed to simply allow mandrel 120c to rotate. Socket 194 and connector 128 can have a non-round shape to provide this torque transfer during manufacture.

In FIG. 7, tensioning rollers 150a and 150b, bonding heaters 151, 151a and 151c, and wrapping materials 140, 141 and 155 can be mounted on a movable platform (not shown) which is designed to move along mandrel 120c at the correct speed to wrap the materials on mandrel 120c correctly. Many configuration for such a movable platform are possible. Materials 140, 141 and 155 can be spool mounted (not shown) where the spools can be mounted on the movable platform (not shown) along with rollers 150*a* and 150*b*, and heaters 151, 151*a* and 151*c*. Additional guides and forming rollers can be used to shape the conduit as it is wrapped on mandrel 120*c* and connector 190. Rollers 150*a* are designed to tension valley forming cord 155 and wear strip 141 to the correct tension, and heaters 151*a* is designed to heat cord 155 and wear strip 141 to the correct temperature to bond to bidirectionally reinforced hose body 200 (adhesives can be used in place of heat bonding). Strip 140*e* can be wrapped multiple times over the ends of conduit 158*f* to form cuffs at both ends over the wire coils there. These cuffs can have several layers to provide a strong exterior for attachment of various hose connectors. In this example, valley forming cord 155, wear strip 141, and reinforced strip material 140 are all wrapped on at the same time, but are staggered to allow individual layers. With the wrapping platform moving from right to left in FIG. 7, strip material 140 goes on first, followed by valley reinforcement 155 and finally by wear strip 141. Note that wear strip 141 and reinforcement 155 do not overlap so their order does not effect the hose structure. However, if additional layering is desired the wrapping platform can make more than one pass to form the hose. This type of hose wrapping system can make multiple passes along mandrel 120*c* to produce nearly any hose with as many layers wrapped at different speeds and angles as desired. The shown hose 158*f*, in FIG. 7, with valley reinforcement 155, is only one possible example.

Using alternate materials and methods in FIG. 7, strip 140*e* can be replaced by a polymer strip similar to strips 143*a-b*, and 143*e* to form the inner waterproof hose body. After the hose body is formed several reinforcement cords like cords 142, 144 or 155 can be wrapped on the conduit from left to right and then from right to left to form a bidirectional reinforcement around conduit 158*f*. This wrapping of reinforcement cords can be wrapped at predetermined angles by adjusting the rotation rate 129 of mandrel 120*c* and/or the relative rate of linear motion of the wrapping equipment with respect to mandrel 120*c*. The reinforcement can then be covered by an additional outer layer of polymer (not shown) and wear strip 141. In alternate configurations the wrapping equipment (150*a*, 150*b*, 151, 151*a*, and 151*c*) and spools of strips 140, 141, and 155 can be stationary while mandrel 120*c* and connector end 190 are moved pass the wrapping equipment to form the helical hose as shown.

Example Conduit Making Machine 100*g*—FIG. 8

In FIG. 8, we see conduit making machine 100*g* designed to make a bidirectionally reinforce conduit 158*g*. Cords 252 and 254 are used to provide the bidirectional reinforcement and cord 155 providing valley forming reinforcement. In FIG. 7, conduit making machine 100*g*, comprises a wire coiling machine 105*a*, an air mandrel 120*d*, an extruder nozzle 340, a roller assembly 130, wrapping machines 250*a-b*, forming roller 160 and tensioning roller 150*a*. Additional bonding and shaping rollers can be used as needed. Coiling machine 105*a*, roller assembly 130, and roller assembly 160 are the same as discussed previously. Air mandrel 120*d* comprises a compressed air port 71, an air channel 73, a plurality of ridge air holes 77, a plurality of valley air holes 79, and a wire guide notch 125. Compressed air line 61 is connected to connector 64 which is screwed into air port 71 to supply compressed air to air channel 73. Compressed air within channel 73 escapes under pressure through air holes 77 and 79 to support conduit 158*g* during manufacturing.

In FIG. 8, wire coiling machine 105*a* bends wire 111 so that the wire rotates along helical wire guide notch 125 with air holes 77 providing an air cushion under the wire to reduce friction. Air holes 79 provide compressed air to the underside of strip 143*e* to provide a support air cushion while strip 143*e* rotates around mandrel 120*d*. A higher density of air holes 77 and 79 can be placed where rollers like roller assemblies 130 and 160 are placed to prevent friction between the interior of the rotating hose and mandrel 120*d*.

Wrapping machines 250*a* and 250*b* can be standard hose wrapping equipment. In FIG. 8, only the nose rings 259*a-b* of wrapping machines 250*a-b* are shown. Wrapping machines can be purchased with two counter-rotating wrapping systems to wrap a hose in both directions at the same time. Knitting Machine Corporation of America in Cleveland Ohio makes a dual deck hose wrapping machine model KM-89-SS which wraps a hose with counter rotating yarn (cords). The model KM-89-SS can be modified to rotate both wrapping decks in the same direction so that it can be used as wrapping machines 250*a* and 250*b* to feed in cords 252 and 254, to nose rings 259*a* and 259*b* along lines 253 and 255, respectfully. Double direction wrapping machines are well known in the hose industry and can easily be modified to rotate the two decks in the same direction for use with the disclosed conduit making machine 100*g*. Thus, with minor adjustments modern wrapping machines (spiral wrap machines) can be easily modified to rotate both decks in the same direction as wire coil 111 to provide the reinforcement wrapping function for cords 252 and 254.

In FIG. 8, cords 252 are rotated by wrapping machine 250*a* at a speed shown by arrow 256*a* which is significantly faster than the rotation rate of wire coil 111 around the mandrel (see speed arrow 146). This difference in rotational speeds puts a right-handed spiral on cords 252 around conduit 158*g*. Similarly, cords 254 are rotated by wrapping machine 250*b* at a speed shown by arrow 256*b* which is significantly slower than the rotation rate of wire coil 111 around the mandrel. This difference in rotation rate puts a left-handed spiral on cords 254 around conduit 158*g*. The rotation rates 256*a* and 256*b* are chosen to provide the desired right-handed and left-handed spiral angle for cords 252 and 254, respectfully. In some designs it can be desirable for cords 252 and 254 to follow the convoluted v-shaped valley on mandrel 120*d* by themselves (valley reinforcement 155 not needed). To do this the rotation rates of cords 252 and 254 relative to the rotation rate of conduit 158*g* must be great enough to allow cords 252 and 254 to drop into the valleys between coils. If cords 252 rotate at the same rate as conduit 158*g* cords 252 only touch the ridge peaks, but as this rotation rate is increased, cords 252 begin to wrap further and further into the valley between coil ridges. At a particular rotational speed difference between cords 252 and conduit 158*g*, that depends on many factors, cords 252 will wrap onto conduit 158*g* just right to touch the bottom of the valley. Additional increasing of rotation speed 256*a* causes cords 252 to wrap more strongly in the valley. Similarly, if cords 254 rotate at the same rate as conduit 158*g* cords 254 only touch the ridge peaks, but as this rate is slowed, cords 254 begin to drop down into the valley more and more as its rotation speed is decreased. At a particular speed, that depends on many factors, cords 254 will wrap onto conduit 158*g* and just touch the bottom of the valley. Additional slowing of rotation speed 256*b* causes cords 254 to wrap more strongly in the valley. Thus, cords 252 and 254 can be wrapped onto conduit 158*g* as needed by choosing the rotational speeds of conduit 158*g*, cords 252 and cords 254.

In one example of rotational speed selection, it can be desirable for conduit making machine 100*g*, in FIG. 8, to be adjusted to provide a mostly longitudinal cord reinforcement and a mostly radial cord reinforcement. The radial cord support can easily be provided by cords 252 being wrapped onto conduit 158g, where the rotational speed (rotation 256a) of cords 252 is approximately ten to fifteen percent faster than the rotation rate (rotation 146) of conduit 158g so that cords 252 lay generally in the longitudinal direction, but still has a strong right-handed twist that can counter the forces of coiled wire 111 that tend to cause twisting of conduit 158g when it is pressurized. At this twist rate, cords 252 would still tend to wrap onto conduit 158g from ridge peak to ridge peak. Cords 254 are wrapped on next and would be given a strong radial component to pull cords 252 down into the valley. Cords 254 might be given a rotation speed (rotation 256b) that is twenty to seventy percent slower than the rotation speed (rotation 146) of conduit 158g so that cords 254 will wrap strongly into the bottom of the valley. As the rotational speed of cords 254 is reduced toward the lower end of these speeds, cords 254 might require some bonding of cords 254 to cords 252 and/or strip 143e to prevent the cords from slipping out of position during use.

In FIG. 8, prior art heaters and adhesive applicators can be used to help form conduit 158g like they are in other examples in this patent. The disclosed bonding methods in this patent and other prior art bonding methods can be used to bond strip 143e, cords 252, cords 254, and/or valley forming cord 155 to each other. Roller assembly 160 can also be heated to help bond cords 252 and 254 and strip 143e together. The high-temperature nature of extruded strip 143e also tends to help bond these hose components together. In alternate examples, cords 252 and 254 can be coated with an adhesive or polymer so that these cords can bond strongly to each other where the cross, forming a bonded mesh that will hold its shape.

In FIG. 8, after cords 252 and 254 are positioned, valley forming cord 155 is guided and wrapped in the valley of conduit 158g. This insures that cords 252 and 254, and strip 143e maintain the v-shaped valley during and after use. Tensioning rollers 150a provide the proper tension or feed rate to cord 155 to produce the desired valley shape. Roller assembly 160 presses all these components together and bonds them into a finished conduit 158g. Finally, additional polymer layers can be extruded over reinforcement cords 252 and 254 if mandrel 120d is made longer and additional polymer extruders are added.

In FIG. 9, we see one possible example of for wrapping machines 250a and 250b. The KM-89-SS-HS (KM-89) dual wrapping machine can easily be modified to provide both wrappings by cords 252 and 254. Two decks provide the support for cord spools 257 and 258, for cords 252 and 254, respectfully. The KM-89 can be modified to allow each deck of spools 257 and spools 258 rotate in the same direction and their speed controlled. This way the KM-89 can supply both sets of rotating cords 252 and 254 to nose rings 259a and 259b, respectfully.

OPERATION OF THE DISCLOSED CONDUIT MAKING MACHINES

Operation of Valley Reinforcement Cord 155

Valley forming cord(s) 155 is wrapped near the bottom of the valley of a convoluted hose as shown in most of the examples presented here. Cord(s) 155 work when wrapped with any bidirectional reinforcement. Cord(s) 155 should be wrapped over any cords that are longitudinally oriented and wrapped around the convoluted hose in the same direction as the wire coil. Generally cord 155 can be bonded to the body of the hose by adhesives or thermal polymers. Valley forming and reinforcing cord(s) 155 provides a stabilizing effect on the bidirectional reinforcement within the hoses disclosed in this document. Reinforcement cord(s) 155 can preferably be wrapped into the valley of a convoluted stretch hose over any bidirectional reinforcement. The tension in cord(s) 155 pulls other reinforcement down into the valley and prevents pressure within the hose from significantly forcing the valley portion outward radially. It also causes the side walls of the valley to form a somewhat v-shape with the walls substantially straight when not pressurized. When pressurized valley forming cord(s) 155 works with any bidirectional reinforcement to resist radial pressure within the hose. By maintaining the convoluted shape, cord(s) 155 assist in maintaining the proper shape of the hose during use so that it can easily retract and folding properly without binding during the retraction process. Valley reinforcement cords 270d and 142b can function essentially the same way as cord(s) 155.

Operation of Differentially Stretchable Bidirectionally Reinforced Strips 140, 140c, 140f and 140k Bidirectionally reinforced strips 140, 140c, 140e, 140f, 140j, 140h and 140k each have diagonal cords 142 and 144 to provide a bidirectional reinforcement. Within strips 140, 140c, 140e, 140f, 140j, 140h and 140k cords 142 and 144 can be locked together in either a woven structure (strip 140), layered structure (strip 140c) or a bonded joint structure (strip 140k). Strips 140f, 140j, and 140h can have any one of these structures. Cords 142 and 144 are angled in opposite directions at angles 148a and 148b from the strips' longitudinal axis 145, respectfully (see FIG. 1). Having the cords woven in strip 140 at a diagonal angle allows longitudinal stretching because the longitudinal component of cords 142 and 144 can increase as the cords are angled more closely to the longitudinal direction 145. Having the cords in strips 140f and 140k bonded together at their intersection (mesh design) allows cords 142 and 144 to angle more closely to direction 145 when stretched, especially when heated to allow the bonded joint to deform. Also note that there are many knitted mesh designs that can be used here as a replacement for strips 140f and 140k. Differential stretching is made possible in all three structures because the reinforcing cords are angled diagonally with respect to the longitudinal axis of the strip. If some of the cords were aligned with the longitudinal direction (145), the strip would not be able to stretch significantly at that point, because these cords would not allow it to stretch. For best operation, the angles 148a and 148b between the cords and the longitudinal direction 145 should be greater than thirty degrees, but less than eighty degrees before being stretched. The larger this cord angles is from the longitudinal, the greater percentage the longitudinal stretch that it can provide. Thus for conduits where the valley and ridge are nearly the same diameter, smaller cord angles near thirty degrees can be used and still produce the desired convoluted helical conduit. For designs where the valley radius is less than sixty-five percent the size of the ridge radius, angles greater than forty-five degrees give better results. The angle of cords 142 and 144 within the final hoses are substantially locked into position after cooling by the stiffness of matrix 143.

Operation of Differentially Stretchable Bidirectionally Reinforced Strips 140a, 140b and 140d Bidirectional knit reinforced strips 140a, 140b and 140d use one or more cords of cord(s) 142 to knit a bidirectionally reinforced fabric layer in a elastomer matrix 143. Knitted fabrics 142a, 142b and 142d are stretchable by the nature of knit structures, and can in general stretch in all directions. However, each knitted fabric 142a, 142b and 142d is designed with a longitudinal portion that stretches much less than other portions of the knit. These low stretch areas acts as a valley forming reinforcement for the purposes of making reinforced stretch hoses. In strip 140a, longitudinal cords 142b provide a very low stretch region along the center of strip 140a. When strip 140a is wrapped on a mandrel to form a hose conduit, with machines like those seen in FIGS. 1 through 8, cords 142b can be pulled tight in the valley to prevent stretching there. At the same time the remainder of knitted fabric 142a can stretch over the wire ridge to form a convoluted hose. Thus cords 142b behave much like the valley reinforcement cords 155 and 270d seen in other examples within this document.

In FIGS. 1E and 2C, strips 140b and 140d, incorporate valley forming reinforcement in the form of a special low stretch knitted portions 142d and 142f, respectfully. Note that the stretch of portions 142d and 142f can be further reduce by adding cords like 142b seen in FIG. 1D to these longitudinal portions. Without this reduced stretch of reinforcement portions 142d and 142f, a typical knit like 142c and 142e would tend to stretch too much. Thus, portions 142d and 142f can be designed to stretch much less than the other portions of the knit reinforced strips 140b and 140d, respectfully. For example, when strip 140b is heated and stretched onto a mandrel, portion 142d might stretch twenty percent in the longitudinal direction 145, while the other portions of knit 142c might stretch sixty percent in the longitudinal direction. This difference between the twenty percent and sixty percent stretch would give an overall differential stretch of approximately forty percent for the strip material. Both the valley and the ridge reinforcement can be taught and able to support internal pressure. Thus, a properly designed knitted strip can shape itself into the convoluted shape of a stretch hose while at the same time providing a low-stretch valley reinforcement portion. Knitted portion 142d in FIG. 1E can provide substantially the valley forming reinforcement properties as cords 142b seen in FIG. 1D, with portion 142d wrapped into the valley of the hose during manufacture. Knitted portions 142f in FIG. 2C also provide the valley forming reinforcement properties similar to knitted portion 142d seen in FIG. 1E. However, portions 142f of strip 140d are placed on each side of the strip and portions 142f are pulled down into the valley and bonded together there. Thus, strip 140b are designed to form the seam at the coiled wire ridge, and strip 140d is designed to form the bond seam in the valley between the wire coils. Because typical knitted material can stretch in all directions it can be useful to use additional valley forming reinforcement, such as, cords 155, 142b and 270d to maintain the shape of the knitted fabrics, especially when the conduit is used in a high temperature environments (temperatures that soften matrix materials 143, 143a-d and allow cords 142 and 144 to shift).

Operation of Differentially Stretchable Cross-Layered Reinforced Strip 140c

In FIGS. 2, 2A and 2B, we see reinforced strip 140c which comprises two separate fiber cords layers comprising cords 142 in one layer and cords 144 in the other layer. Both layers are bonded within matrix 143 near the mid-thickness of strip 140c. The cords 142 and 144 are angled diagonally across the strip it opposite directions so that the cords reinforce strip 140c along two dimensions, thus each providing a portion of both longitudinal and radial reinforcement. During production, strip 140c is heated by heater 151 until it is deformable. Strip 140c is then pulled by rotating wire 110 at the transverse location 154 of coiled wire 110 which causes strip 140c to stretch differentially. As strip 140c stretches longitudinally, fiber cords 142 and 144 will tend to orient toward the longitudinal direction 145 in those zones where the strip is stretched significantly. In zones of low or no stretching (zone 154 in FIG. 1, and zones 152a-b in FIG. 2), fiber cords 142 and 144 will tend to remain at their original angle. Also, if the cords are not woven, the natural limitation in stretch does not exist. Thus, strip 140c can be stretched until fiber cords 142 and 144 delaminate from each other. Care must be taken to prevent over stretching of non-woven strips like strips 140c when heated to its plastic state. Because strips with layers of fiber or cords can stretch no matter what the angle of the cords are, the user can choose angles that specifically meet their needs. After strip 140c is stretched into a somewhat u-shaped cross-section, valley forming reinforcement cord 155 is wrapped at the bottom of the valley (on seam 157) to increase the depth of the valley and force a more v-shape cross-section in the valley of the hose body. Rollers 150a and heater 151a provide the correct tension and temperature, respectfully, to create the correct v-shaped structure and bond cord 155 to strip 140c.

Operation of Differentially Stretchable Multi-Layered Reinforced Strips 140g, 140i, and 140h In FIGS. 4, 4A and 4B, we see multi-layered reinforced strips 140g, 140i and 140h which comprises strip material with bidirectional reinforcement cords 142 and 144 in a double wide strip (strip 140h) and triple wide strip (strip 140g and 140i). Because the width of strips 140g, 140i and 140h is wider than the distance between two coils (2 coil pitches), these strips will wrap around the conduit and create a hose is more than one layer thick. Strip 140g and 140i seen in FIGS. 4 and 4A, respectfully, are composite strips and comprise three separate strips bonded together to form a wide format strip. Each of these separate strips 143a, 140f, 140j and 143b are differentially stretchable when heated. Strips 143a and 143b have no reinforcement and are used to provide an inner and outer sealing layer when wrapped on a mandrel. Bidirectional reinforcement layers 140f and 140j are also differentially stretchable because of the diagonal orientation of cords 142 and 144 that is similar to strip material 140. Strip 143b is last to go on and cord 155 compresses all the layers to provide a v-shaped valley to finished conduit 158c.

In FIG. 4B, we see a section view of strip material 140h, which can be used in conduit making machines 100a-g. In use with conduit making machine 100c, strip 140h would be fed into rollers 150c in the same position as strips 143a and 140f seen in FIG. 4. After strip 140h is heated by heater 151b, it would be stretched over coiled wire 110. Heat shield 159c and right most heat shield 159 can reduce heating of the two transverse portions of strip 140h corresponding to the valley portion 124a of mandrel 120b so that these portions will not significantly stretch. Rollers 132 would then press and bond strip 140h to itself as strip 140h would wrap over itself twice. Strip 140h because of its double width will follow wire coil 110 and wrap twice over itself forming a double layer between the coils and a triple layer at the ridge of coiled wire 110.

Operation of Conduit Making Machine 100—FIG. 1

In FIG. 1, we see an example of a continuous conduit making machine 100. Spring bending machine 105 comprises a standard spring coiling machine with drive rollers 106 (only one roller shown for drawing clarity). Drive rollers 106 are used to feed wire 110 under force into wire bending tool 107. Bending tool 107 is often called a point tool because the wire contacts it at substantially a single point to cause it to bend. This point contact causes the wire to bend into a radius determined by how far the point tool is from the wire feeder guide, and at what angle it is oriented, and the type of wire being bent. Mandrel 120 is securely fastened to bending machine 105 or to another mechanical support structure fixed in position relative to bending machine 105. Mandrel 120 is positioned so that as wire 110 loops around the mandrel after it is bent. Tool 107 and spring bending machine 105 are adjusted to give wire 110 a pre-bias that tends to retract the coiled wire 110. Thus, wire 110 is formed into a tension spring. After wire 110 proceeds off the wire coiling machine's bending tool 107 it encounters wire guide 122 that slowly mechanically stretches the now coiled spring wire 110 as it rotates around the mandrel. Wire guide 122 extend the spring to the desired coil pitch before entering wire groove 122*a*. Notice that as the wire nears the area where strip 140 is laid onto coiled wire 110, the wire guides take on the form of a groove 122*a* that circles mandrel 120 along a spiral path. Coiled wire 110 rests in groove 122*a* with the groove edges aligning with wire 110 to provide a somewhat continuous surface. This is to allow wire 110 and mandrel 120 to combine to form the desired shape for the interior surface of strip 140 as it is formed into a final conduit or hose 158. In this way, the shape of the wire and the mandrel help determine the final shape of the finished conduit 158.

While wire 140 proceeds to revolve around mandrel 120 to the right, reinforced polymer strip 140 is pulled in toward mandrel 120 through a pair of tensioning rollers 150. After passing through rollers 150, heater 151 radiantly heats strip 140 to near the melting point of matrix 143 within strip 140. During heating, heat guard 159 reflects heat from the center portion of strip 140 preventing a small transverse portion of strip 140 from reaching a temperature that would allow easy deformation of matrix 143 within strip 140. Strip 140 is guided into position relative to rotating wire coils 110. Wire coils 110 are rotating at a linear speed significantly faster than the linear speed of strip 140 moving through tensioning rollers 150. This means that polymer strip 140 must stretch in order to continuously wrap onto wire 110. The center of strip 140 (center transverse portion 154) has not reached a temperature sufficiently high to become easily deformable so it stretches much less and forms the smaller radius portion of the conduit, which follows valley portion 124 of mandrel 120. Portions 152*a* and 152*b* of strip 140 are stretched significantly by the pull of wire 110 and rollers 132 and 134 on roller assembly 130. The actual stretching takes place before strip 140 actually wraps onto wire 110, since wire 110 and rollers 132 & 134 do not allow strip 140 to stretch significantly after contact. Friction from wire 110 and rollers 132 & 134 must be sufficient to provide the needed force to stretch strip 140 without it slipping off of coiled wire 110. During the stretching of strip 140 from heater 151 to rollers 132 and 134, the width of strip 140 narrows slightly as diagonal reinforcing fibers cords 142 and 144 are shifted to a slightly more longitudinal angle. Providing larger values for angles 148*a-b* will reduce the amount of shrinkage in the transverse direction because of the geometry of fiber cords 142 and 144. The needed width of strip 140 is also effected by the depth the strip indentation at valley 124. The deeper the indentation the more strip material 140 is needed to bridge the gap between adjacent coils of wire 110. This is because fiber cords 142 and 144 have a higher melting temperature than matrix 143 and do not lengthen or shorten significantly during this heating and stretching process. This means that shaping strip 140 into the u-shape valley 124 requires strip 140 to be significantly wider than the pitch between coils of wire 110. For example, if the spacing (pitch) between wire coils 110 is 0.65 inches where strip 140 is wrapped onto wire 110, and a 0.20 inch overlap is needed on each side, and the u-shaped indentation requires thirty-five percent additional width to form that shape, then 0.90 inches of material will be needed to go between wire coils plus 0.10 inches overlap on each side, for a total strip width of 1.10 inches. The final v-shaped valley is formed when valley forming cord 155 is wrapped in the valley and pulls cords 142 and 144 tight within strip 140. This tightening of cords 142 and 144 tend to straighten the walls of the valley and form the desired v-shaped cross-section for the valley. Wrapping of cord 155 in the valley also shifts cords 142 and 144 in toward the valley slightly. Thus, sufficient overlap at seam 156 should be provided to allow for this shifting of the cords.

After strip 140 has been wrapped onto wire 110, rollers 132 and 134 motivate strip 140 around mandrel 120 until it makes one complete revolution. At that point the left edge of strip 140 meets the right edge of itself being wrapped onto wire 110. Thus the right edge of incoming strip 140 is laid on top of the left edge of strip 140 that has traveled one revolution around mandrel 120. Because strip 140 is hot and partially melted, strip 140 sticks to itself forming a bond. Roller 132 at the same time applies pressure to this overlap portion of strip 140 to force the soft polymer matrix 143 of the strip together and permanently fuse strip 140 to itself. In this way a continuous conduit of reinforce polymer is formed over coiled wire 110 which has a convoluted helical shape. Roller assembly 130*a* provides shaping and pressing of bond zone 156 a second and third time to insure complete water tight fusing of strip 140 to itself. Valley forming reinforcement cord 155 is tensioned by rollers 150*a* and heated to a tacky state by heater 151*a*. Cord 155 is then wrapped onto the hose near the center of the valley and tension in the cord pulls the bottom of the valley to the desired radius. This action also tends to straighten the walls of the valley to form a somewhat v-shaped cross-section to the valley. The still tacky cord 155 bonds to strip 140 to permanently hold cord 155 in place.

After this the finish conduit 158 rotates off mandrel 120 to the left (direction 147, see FIG. 1). Pullers can keep conduit 158 extended while it cools and then allow coiled spring wire 110 to retract the hose into its full retracted position for further cooling. Care must be taken to allow sufficient cooling before retracting the hose. Note that coiled wire 110 will cause conduit 158 to retract fully unless other forces keep it extended (either groove 122*a* or a puller beyond the right end of mandrel 120). This is because when the conduit is retracted, the outside of strip 140 is forced together by spring wire 110, which can cause the outside of strip 140 to bond to itself if it is too hot. Thus, proper cooling of conduits 158*a-g* is important because the conduits need to cool before conduit body retracts against itself (see section 170 in FIG. 2) to prevent bonding the exterior portions of the hose.

In FIG. 1D, we see a top view of warp knitted reinforced strip material 140*a* designed for use with conduit making machines like 100, 100*a*, 100*b*, 100*c*, 100*d*, 100*e*, 100*f* or 100*g* seen in FIGS. 1 through 8, respectfully. As an example, when strip 140*a* is used with conduit making machine 100, knitted section 142*a* is stretched and can easily differentially stretch to form a convoluted structure. As strip 140*a* is heated by heater 151, matrix material 143 softens and the strip can be stretched over the wire coils. However, because valley forming cords 142*b* are knitted longitudinally into strip 140*a*, tension on rollers 151 causes the center portion of strip 140*a* to be pulled into the valley and form the desired shape for valley between the wire coils. When using strip 140*a* with conduit making machine 100, heat guard 159 can be optional since cords 142*b* will not stretch significantly even when heated because they are oriented in longitudinal direction 145. Thus, even if matrix 143 softens, cords 142*b* can prevent the center portion of strip 140*a* from stretching.

In FIG. 1E, we see a top view of warp knitted reinforced strip material 140*b* designed for use with conduit making machines like 100, 100*a*, 100*b*, 100*c*, 100*d*, 100*e*, 100*f* or 100*g* seen in FIGS. 1 through 8, respectfully. As an example, when strip 140*b* is used with conduit making machine 100, knitted section 142*d* is much less stretchable that the other portions of knitted fabric 142*c*. As strip 140*b* is heated by heater 151, matrix material 143 softens and the strip can be stretched over the wire coils. However, because section 142*d* has a knitted structure that limits its longitudinal stretch, tension on rollers 150 causes the center portion of strip 140*b* to be pulled to the valley and form the desired shape for the valley between the wire coils. When using strip 140*b* with conduit making machine 100, heat guard 159 is not needed since section 142*d* will generally not stretch significantly more even when heated because the knit there cannot stretch as much as the rest of fabric 142*c*. Thus, even if matrix 143 softens, section 142*d* can prevent the center portion of strip 140*b* from stretching excessively.

In FIG. 2C, alternate knitted reinforced strip material 140*d* is designed specifically for use with conduit making machines 100*a* seen in FIG. 2, but could be used with any conduit making machine within this document with slight modification. Strip 140*d* differs from the other strips disclosed in this document in that strip 140*d* is designed so the center of the strip lands on the coil ridge and the low-stretch knitted edges 142*f* are bonded in the valley. During production strip 140*d* is centered on coiled wire 110 and stretched on to wire 110. The center portion of strip 140*d* stretches while the edge sections 142*f* resist stretching because of they way fabric 142*e* is knitted there. Heating of strip 140*d* by heater 151 allows matrix polymer 143 to soften and fabric 142*e* to stretch. Sections 142*f* have limited stretch so that tensioning rollers 150 can pull strip 140*d* down into the valley on each side of the wire coil and form the proper valley shape. With low stretch sections 142*f*, the need for cord 155 becomes optional, since sections 142*f* acting as the valley forming reinforcement and maintains the depth of the valley.

Operation of Conduit Making Machine 100*a*—FIGS. 2 Through 2C

In FIG. 2 we see conduit making machine 100*a* using mandrel 120*a* to produce convoluted hose. Conduit making machine 100*a* operates quite differently than conduit making machines 100, but can produce substantially the same hose from the same materials, and can be substituted for mandrels 120 and 120*b* shown within this document with only minor modifications. Conduit making machine 100*a* comprises four rotating rods 122*a* through 122*d* which are used to assist in rotating wire 110 and provide a moving surface to compress and bond the seam 157. Wire 110 can be coiled slightly differently than in FIG. 1 because the rotating rods 122*a*-*d* can assist in bending the wire around the mandrel. In this example, and strip 140*c* is fed through rollers 150 and heated by heater 151. Each side of strip 140*c* is limited from stretching by heat guards 159*a* and 159*b*. However portions 152*a* and 152*b* must be heated to allow bonding at bond zone 157. Roller assembly 180 can also help reduce the pull on edge portions 152*a*-*b* by forcing the desired shape and to limit the amount of stretching that occurs. After strip 140*c* makes on loop around mandrel 120*a*, roller surface 184 then presses the two edges of strip 140*c* together against the rotating rod 122*c* on the interior of the hose and fuses matrix material 143 within the edges of strip 140*c* together. Additional rollers and guides can further shape and bond the conduit before it exits mandrel 120*a* to the right (direction 147). As finished conduit 158*a* rotates off of mandrel 120*a*, coiled wire 110 is no longer supported by mandrel 120*a*. This causes conduit 158*a* to retract to its natural state 170 which is the fully retracted position for conduit 158*a*. Additional mandrel length can be used to keep conduit 158*a* stretched while cooling it, or rotating pullers common to the industry can keep conduit 158*a* stretched after exiting mandrel 120*a*. Both of these methods can be used to set the shape of strip 140*c* in an extended convoluted shape. Note that strips 140, 140*a*-*b*, and 140*f*-*h* in many instances can be used in place of strip 140*c*.

In FIG. 2C we see knit reinforce strip 140*d* which can be substituted for strip 140*c*. With this substitution, conduit making machine 100*a* can optionally use valley forming cord 155 and heat guards 159*a* and 159*b*. Strip 140*d* does not need valley reinforcement 155 because low stretch portions 142*f* server this purpose. Also Strip 140*d* does not need heat guards 159*a* and 159*b* because the stretch of knitted portions 142*f* are not significantly effected by softening matrix material 143 and can be compensated for in the design pattern of portion 142*f*.

Operation of Conduit Making Machine 100*b*—FIG. 3

FIG. 3 show a conduit making machine 100*b* is shown providing a v-shaped valley reinforcement where the entire wall of the valley is shaped by multiple radial cords 270*a* through 270*d*. By applied to valley reinforcement across the entire surface of the valley, convoluted stretch hose 158*b* can be assured to maintain it shape even at elevated temperatures. As with the conduit making machine 100 seen in FIG. 1, conduit making machine 100*b*, starts by coiling spring wire 110 around mandrel 120. After stretching coiled spring 110 to the desired coil pitch, strip 140 is wrapped onto the wire and bonded to itself as previously discussed. After roller 132 presses bond seam 156 to fuse the two edges of strip 140, additional layers and reinforcement can be added. In FIG. 3, this additional reinforcement takes the form of many matrix coated fiber cords 270*a*-*d* and 272 (see FIG. 3A), that are heated and then bonded to the exterior of strip 140 after it is in the form of a finished conduit 158*b*.

In FIG. 3, additional reinforcing cords 270*a*-*d* can be bonded over the new conduit made from strip 140. After the conduit is formed by strip 140 and continues to moves to the right for application of a second layer of bidirectional reinforcement. Heater 151*b* can reheat the outside surface of strip 140 and also heats the underside of radial cords 270*a*-*d*. Additional heaters may also heat longitudinal cords 272 (if heat bonding is the bonding process). Longitudinal cords 272 can be optional in this example because of the bidirectional reinforcement in strip 140. Cords 272 can be fed off of spools (not shown) through ring-shaped cord guide 278 in the direction 273 toward mandrel 120 while simultaneously rotating around mandrel 120 as shown by arrow 146*a*. At the same time, seven radial cords 270*a*-*d* are fed off of spools (not shown) and directed to tensioning bar 150*b* and then through cord guide 276. Guides 276 and 278 are drawn in a simplified manner, and are representative of the many types of cord guides that are possible. For example, heated rollers could be used instead of the static guides shown in conduit making machine 100*b*. Also note that guides 276 and 278 are shown far from mandrel 120 to improve the clarity of the drawing. In an actual system, guides 276 and 278 could be placed very close to the actual bonding area and roller(s) used to press cords 272 and 270*a*-*d*, and strip 140 together. Cords 272 and 270*a*-*d* can be non-coated yarn made of nylon and/or polyester fibers if additional matrix material or adhesives are used (see FIG. 6). Coating and bonding of the non-coated yarn to hose 158*b* can comprise adding another layer of strip material similar to strips 140, 140*c* and 140*f* over the reinforcement or coating hose 158*b* with a liquid polymer adhesives which is commercially available, or other methods. The reader should understand here are many alternative combinations of the disclosed technology with present manufacturing processes.

In FIG. 3, as cords 272 get close to strip 140, an optional guide bar 277 helps force cords 272 into close proximity with strip 140 just prior to wrapping radial cords 270a-d. In this way, the left most cord 270b can wrap over cords 272 and force cords 272 against strip 140 for bonding without the left most cord 270b slipping significantly from its desired bonding location on finished conduit 158b. Rollers 135a-g make contact with cords 270a-d just prior to pressing these cords against strip 140. Rollers 135a-g can be offset from each other so that the rightmost cords are pressed against strip 140 before the leftmost cords. Each radial cord 270a-d is wrapped around conduit 158b at a different rate to desired radius of that portion of conduit 158b and thus shape the valley into whatever cross-sectional shape is desired. Rollers can be used to help press and shape cords 170a-d into strip material strip 140. After cords 272 are guided onto strip 140 and cords 270a-d are wrapped over them, the entire conduit rotates around mandrel 120 to be heated again by heater 151b, where additional rollers can insure these cords are securely bonded to the exterior of strip 140 and to themselves. After cooling, finished conduit 158b can be allowed to retract back to its natural state.

Operation of Conduit Making Machine 100c—FIGS. 4, 4A and 4B

In FIG. 4, we see conduit making machine 100c which is very similar to conduit making machine 100, however, strips 140g, 140i and 140h which can be wrapped by machine 100c are substantially wider than strip 140 used with machine 100. In FIGS. 4 and 4A, strips 140g and 140i are slightly more than three coils wide so that when wrapped on wire 110 a three layer structure is formed. In FIG. 4B, strip 140h is slightly more than two coils wide and thus wraps on in two layers. Thus, these wider strip covers two or three coil lengths at a time. Looking at FIG. 4 as the example, roller assemblies 130 and 130a help motivate strips 140g around mandrel 120b with wire 110, and helps bond the strip to itself at the ridge formed by coiled wire 110. Rollers 132 apply force to the edges of strips 143a, and 143b to achieve bonding. strip 140g passes through rollers 150c their speed is controlled by the speed at which rollers 150c are turning. Heater 151b heats strips 143a-b to their deformation temperature. Heat shields 159 protect the center of strips 143a-b so that the center portion deform significantly less during stretching. Stretching of the strips is accomplished by the greater linear speed of wire 110 compared with the linear speed of rollers 150c. Since the center portion of strip 143b is not heated to its deformation temperature it can apply tension to the center portion of mesh 140f and push it down into the valley between the coils. Stabilizing polymer reinforcement cord 155 can be applied to reinforcing mesh 140f to insure that mesh 140f shapes itself to mandrel 120b during stretching. However, even without stabilizing reinforcement 155, strip 143b will tend to press mesh 140f into the valley portion of mandrel 120b forming a v-shaped valley as it is wrapped on top of mesh 140f. However, this v-shaped valley might not maintain its shape during operation without valley reinforcement 155, especially at elevated temperatures. After the conduit portion (strip 143a, 140f and 143b) are bonded by heat and pressure by rollers 132, wear strip 141 can be bonded onto the outer ridge of the conduit through either heat bonding, adhesives, or other bonding methods. Pressure from roller 131 assists in the bonding. Finished conduit 158c can leave mandrel 120b and be pulled a short distance while cooling, before the conduit is allowed to relax into its retracted length. This allows conduit 158c to set in the shape of the extended position of the conduit when pressurized. This is done to provide a smooth even shape for the conduit when pressurized, so there is no high stress points. When conduit 158c is relaxed and retracted, it might have creases or folds in its reinforced strip materials, but there is no pressure on the strips in this position and little damage can be done. Additional rollers can be added to insure a good bond between strips 143a and 143b through mesh 140f, for an airtight conduit. Conduit making machine 100c can similarly be used to wrap and bond strip materials 140i and 140h into a similar stretch hose conduit shape.

Operation of Conduit Making Machine 100d—FIGS. 5 and 5A

Operation of conduit making machine 100d is very similar to the other conduit making machines presented here, but has three separate strip feeding systems for wrapping and creating a finished conduit. In this particular example, three separate strips 143a, 140k and 143a are fed through their own tensioning rollers 150. Each tensioning roller may be adjusted for its particular strip material, but can be essentially identical to each other. Rollers 150 may provide a predetermined linear speed for feeding the three strips each which can be a different speed. Heater 151c then heats all three strip 143a-b and 140k to the deformation temperature or deflection temperature of the material of which strips 143a-b are composted. The two heat guards 159 protect the center portion of strips 143a-b. If valley reinforcement 155 is made from a low temperature polymer the center heat shield 159 can protect valley reinforcement 155 so that it can maintain a tension for forming the valley. Reinforcing strip 140k could be replaced with a reinforced strip like strip 140, but with just enough polymer matrix 143 to hold the reinforcing cords 142 and 144 in place (see strip 140j in FIG. 4A, an optional way to make strip 140k). Such a coated strip would differentially deform onto mandrel 120b similar to strip 140. In FIG. 5, bonding roller assemblies 130a are shown for rolling and bonding the ridge portion of conduit 158d. Additional rollers can be used to bond the strip as needed. The inner layer formed by strip 143a is bonded to itself and forms a air tight conduit before it reaches the position where reinforcing strip 140k is wrapped over it. Finally, strip 143b is stretched over reinforcing strip 140k and strip 143a and bonded through mesh 140k to strip 143a. After bonding at the ridge an additional wear ridge can be added as shown in other examples (i.e. wear strip 141 in FIG. 4).

Operation of Conduit Making Machine 100e—FIG. 6

In FIG. 6, conduit making machine 100e is very similar to conduit making machine 100d seen in FIG. 3. The difference is that the radial cords 142 and 142b are coated by an extruder just prior to being wrapped onto conduit 158e. This eliminates the need for pre-coating the reinforcement cords and also provides the outer sealing layer at the same time. Cords 142b provide the valley forming reinforcement, while cords 142 assist in maintaining the v-shaped valley even when pressurized.

In FIG. 6, the operation of conduit making machine 100e starts by bending a coiled tension spring with coated wire 111. As coiled coated wire 111 rotates around mandrel 120 it is stretched to the correct coil pitch by mandrel guides 122 and 126 so that polymer strip 143a can be stretched over the rotating coiled wire. After roller 132 presses the two edges of strip 143a together and bonds them a convoluted stretch hose structure is formed. This hose structure continues rotating to the right on mandrel 120 where it reaches a reinforcing section comprising a plurality of longitudinal cords 272, guide ring 279, extruder nozzle 310, and a plurality of cords 142 and 142b. Longitudinal cords 272 can rotated slightly faster in the direction 146a than the conduit (wire 111 and coiled strip 143a) so that cords 272 wrap onto strip 143a in a right-hand spiral (opposite the left-handed spiral of coiled wire 111). This right-hand spiral of cords 272 creates an opposing force to the left-hand spiral of coiled wire 111 to resist the natural tendency for the convoluted hose to rotate along its axis when pressurized. That is, the expansion of coiled wire 111 from internal pressure will tend to cause significant rotation of conduit 158e along its axis. The opposite spiral of the reinforcement counters the axial rotation caused by the spiraled coiled wire 111.

As cords 272 rotate, stationary guide ring 279 forces cords 272 in alignment with the surface of the conduit formed by strip 143a. This way extruded strip 143d can effectively cover and bond cords 142, 142b and 272 to the conduit formed by strip 143a. Tension within cords 142 and 142b, inside extruded strip 143d help pull cords 272 against the conduit formed by strip 143a. Then cords 142 and 142b are used to press elastomer 143 in outer layer strip 143d through reinforcing cords 272 and into inner layer strip 143a, thus bond all the layers together. Additional rollers can be used to insure desired bonding. Mandrel 120 provides some support for the interior surface of conduit 158e as it is pressed by cords 142 and 142b.

Crosshead extruder die 310 excepts melted elastomer 143 for extrusion at port 314 where the elastomer surrounds cords 142 entering die 310 at openings 312. Cords 142 are infused with melted elastomer 143 within extrusion die 310 and are encapsulated within extruded strip 143d. The drawing of extrusion die 310 is only for representation of components and actual crosshead extrusion dies can comprise various designs.

Operation of Conduit Making Mandrel 100f—FIG. 7

In FIG. 7 we see a conduit making mandrel 100f which uses a rotating mandrel 120c to form the desired conduit shape. While the other examples of conduit making machines in this document show continuous conduit making processes, FIG. 7 shows a process that is designed to build one conduit 158f on mandrel 120c at a time. During production of hose 158f, mandrel 120c and connector end 190 are rotated in direction 129 while various layers of strip materials are wrapped and bonded around mandrel 120c. Many different combinations of layering is possible, two examples will be discussed here. First, the arrangement in FIG. 7 will be discussed where a single pass wrapping process is use. Second, we will consider a multi-pass wrapping process with continuous bidirectional reinforcement.

In FIG. 7 we see one example of how conduit 158f can be layered on mandrel 120c and connector 190 using strip material similar to strip 140. After wire 111 is coiled onto mandrel 120c, a strip similar to strip material 140 can be wrapped over wire 111 from right to left on rotating mandrel 120c and bonded at its seam similar to other conduits seen in this document. Following behind the bonding of strip 140 would be the wrapping on of wear strip 141 and the bonding of valley reinforcement cord 155. This style of mandrel hose construction with cylindrical mandrels is common in the hose industry, but the use of a convoluted mandrel is new.

A second example of how conduit 158f can be formed using the conduit making machine seen in FIG. 7 would be to have a three pass construction. Reinforced strip material 140 would be replaced by a plain polymer strip material like strip 143a or 143b, though some single direction reinforcement could be used. Also single cord 155 would be replaced by several radial reinforcement cords similar to cords 270a-d seen in FIG. 3. The first pass would start with the wrapping platform (rollers 150 and 150a, and heaters 151, 151a, and 151c and strip material and cords) moving from right to left and both coiling wire 111 and bonding a layer of strip material 143a over the wire and wrapping a first set of cords 270a-d over the bonded strip material. The wire coiling portion on the wrapping platform is not shown in this drawing to keep the drawing less cluttered, but can be placed next to the other wrapping and heating components. The second pass with the wrapping platform moving from left to right wraps on a second set of cords 270a-d with the opposite twist as the first layer so that they form a bidirectional reinforcement. Also during the second pass a second layer of polymer strip 143a is wrapped over the bidirectional reinforcement and bonded together at the seam using a number of different methods (i.e. thermal bonding, adhesives, etc.). Note that this second layer of both the cords 270a-d and polymer strip 143a is spiraled in the opposite direction as coiled wire 111 and thus the cords and strip seam crosses the valley and ridge many times along the length of conduit 158f. If the first and second layers of strip materials need to be different, two polymer strips such as 143a and 143b can be used for the separate passes. The third pass from right to left could lay down a valley reinforcement 155 and bond a wear strip 141 to conduit 158f as desired. The formed conduit would be similar in layer construction but the bidirectional cords would be continuous in this example and have slightly different orientations within conduit 158f than when using strip material 140. Many other layering options and positioning of layers are possible with this general type of platform. For example, valley reinforcement cord 155 can be wrapped on to the conduit after the wrapping of cords 270a-d, but before bonding the second layer of polymer strip over the conduit to seal in cord 155. Or cord 155 can be left off entirely and rely instead on the radially wrapped cords 270a-d to provide valley reinforcement. Many additional layers of materials can be added within the conduit construction and between the bidirectional reinforcement and the valley forming reinforcement if desired.

Operation of Conduit Making Machine 100g—FIG. 8

In FIG. 8, conduit making machine 100g produces a hose that is very similar to the other conduit making machines in this patent, but because it uses two cord wrapping machines 259a-b the angle of cords 252 and 254 can be chosen as desired. Wire coiling machine 105a bends coated wire 111 around air mandrel 120d as previously discussed, and wire 111 is guided by groove 125 at the ridge of mandrel 120d. Compressed air from compressed air line 61 enters channel 73 and forces compressed air out of the plurality of holes 77 and 79. Air exiting holes 77 produce an air cushion in groove 125 for wire 111 to float on. Compressed air exiting holes 79 produce an air cushion in the valley of the mandrel for strip 143e to float on. Thus, the compressed air exiting holes 77 and 79 greatly reduce the friction of conduit 158g against mandrel 120d and it is allowed to rotate freely. Extra air holes, and/or larger air holes, are placed near the area where rollers 132 and 134 contact conduit 158g to provide greater cushion against the forces created by the rollers. Similarly, extra air holes, and/or larger air holes, are provided in the area roller assembly 160 will be pressing against conduit 158g to provide enhanced additional air cushion there. Extruded strip 143e is wrapped onto wire 111 while still hot and the strip is pressed into itself by roller 132 to bond the edges of the strip together to form a watertight and airtight conduit.

In FIG. 8, after strip 143e is formed into a conduit, reinforcement cords 252 and 254 are wrapped onto the conduit by standard wrapping machines 250a and 250b, respectively. Rotation direction arrows 146, 256a, and 256b show the direction of rotation for conduit 158g, cords 252, and cords 254, respectfully. The length of direction arrows 146, 256a, and 256b show the relative speed at which that item is rotating. Thus, in this design example, cords 252 are rotating the fastest so that they are wrapped with a right-handed twist onto conduit 158g, and cords 254 are rotating the slowest so that they are wrapped with a left-handed twist onto conduit 158g.

The rotation speed of conduit 158g is between these two speeds. Nose rings 259a and 259b guide cords 252 and 254, respectfully, onto conduit 158g and properly place the cords on the conduit. The rotational speeds 146, 256a, and 256b can be selected so that cords 252 and 254 naturally form a valley between the coils of the desired depth. Thus, with the correct ratio of speeds cords 252 and 254 can provide valley reinforcement to help hold the valley in place against internal hose pressure. To increase resistance to internal hose pressure, reinforcement cord 155 is wrapped over cords 252 and 254 to insure a stable v-shaped valley. Additional layer can then be extruded or sprayed on to waterproof the exterior of the hose, and/or bond cords 252, 254 and 155 in permanently in place. Additional air holes, and/or larger air holes 77 and 79 can be placed on mandrel 120d where cords 252, 254 and 155 are wrapped onto conduit 158g. This provided added air cushion at the locations where the cords tension tend to press the conduit against the mandrel and reduces friction that might be caused by the added pressure of the cords.

RAMIFICATIONS, and SCOPE

The disclosed examples of a valley forming reinforcement and manufacturing processes that it can be used with to produce reinforced convoluted stretch hoses has several advantages over prior art hoses and systems. First, the valley forming reinforcement helps shape the valley portion of a helical convoluted stretch hose with bidirectional reinforcement which cannot form the valley on its own. Second, valley reinforcement helps form and maintain a v-shaped cross-section which reduces the reinforcement angles at the wire and the valley to improve longitudinal strength. Third, the valley forming reinforcement helps provide additional radial pressure strength by partially supporting the hose body in the radial direction. Fourth, valley reinforcement reduces the tendency of the hose body to permanently expand and deform radially during use at elevated temperatures. This is especially true with stretchable knit reinforcements which can stretch in all directions under force.

Although the above description of the invention contains many specifications, these should not be viewed as limiting the scope of the invention. Instead, the above example descriptions should be considered illustrations of some of the presently preferred embodiments of this invention. For example, the of differentially stretchable strips for the construction of the conduits is only presented as examples of conduit construction that be used with valley forming reinforcement, and other convoluted hose reinforcement structures will work equally well with valley forming reinforcement to improve internal pressure strength and prevent permanent radial deformation of the hose body, which can prevent retraction of the stretch hose. Also, many mandrel designs and styles exist that can be used with the disclosed hose manufacturing systems. For example, the mandrel design is not limited to just solid rods mandrels (FIGS. 1, 3, 4, 5, 6), multiple rotating rods mandrels (FIG. 2), rotating mandrels (FIG. 7), with internal rollers or bearings that provide low-friction surfaces for the rotating hose (FIG. 8), and other prior art mandrel styles and designs.

Thus, the scope of this invention should not be limited to the above examples but should be determined from the following claims.

I claim:

1. An extendable reinforced convoluted pressure hose having an extended length and a retracted length, comprising:
   a) a convoluted stretch hose body having a valley portion and a ridge portion;
   b) a valley reinforcement cord comprising one or more of high strength fibers with a tensile strength greater than 15,000 psi;
   c) a metal biasing spring having a tendency to return the hose from the extended length to the retracted length;
   wherein:
   A) the valley reinforcement cord is wound in a helical path along the valley portion of the convoluted stretch hose body, whereby the valley reinforcement cord stabilizes the valley portion of the convoluted stretch hose body and substantially maintains the radial position of the valley portion at the extended length;
   B) the biasing spring is located along the ridge portion of the convoluted stretch hose body, whereby the biasing spring supports the ridge portion of the stretch hose body at both the extended length and the retracted length; and
   C) the stretch hose body is between the valley reinforcement cord and the biasing spring, with the biasing spring disposed on the stretch hose body's interior, and the valley reinforcement cord disposed on the stretch hose body's exterior;
   D) the extended length is at least twice the retracted length.

2. The reinforced convoluted hose in claim 1, wherein the valley reinforcement cord is coated with a polymer matrix material, wherein the coated valley reinforcement cord can be bonded to the valley portion of the convoluted stretch hose body.

3. The reinforced convoluted hose in claim 2, wherein the convoluted stretch hose body comprises a thermoplastic and/or an elastomer.

4. The reinforced convoluted hose in claim 1, further including a means of bonding the valley reinforcement cord to the convoluted stretch hose body for further stabilizing the valley portion of the convoluted hose.

5. The reinforced convoluted hose in claim 4, wherein convoluted stretch hose body comprises a thermoplastic and/or an elastomer.

6. The reinforced convoluted hose in claim 1, further including one or more valley shaping cords positioned along the walls of the valley portion.

7. The reinforced convoluted hose in claim 1, wherein the convoluted stretch hose body comprises bidirectional fiber reinforcement.

8. The reinforced convoluted hose in claim 1, further including a plurality of longitudinal reinforcement cords positioned on convoluted stretch hose body under the valley reinforcement cord.

9. The reinforced convoluted hose in claim 8, wherein the plurality of longitudinal reinforcement cords are oriented so that they spiral around the convoluted stretch hose opposite the direction of the valley portion spiral.

10. An extendable reinforced convoluted pressure hose having an extended length and a retracted length, comprising:
   a) a convoluted stretch hose body having a valley portion and a ridge portion;
   b) a metal biasing spring disposed along the ridge portion of the convoluted stretch hose body and adapted to:
      i) allow the reinforced convoluted hose to extend to the extended length when pressurized;
      ii) automatically retract the convoluted hose to the retracted length when depressurized; and
      iii) support the ridge portion of the convoluted stretch hose body at both the extended length and the retracted length;

c) a valley reinforcement cord disposed along the valley portion of the convoluted stretch hose body, and adapted to maintain the valley portion's radial position at the extended length;

wherein:

A) at both the extended length and the retracted length, the ridge portion of the convoluted stretch hose body has an inside diameter which is:
   I) greater than or equal to an outside diameter of the biasing spring; and
   II) greater than any other portion of the convoluted stretch hose body's inside diameter;
B) at the extended length, the valley portion of the convoluted stretch hose body has an outside diameter which is:
   I) less than or equal to an inside diameter of the valley reinforcement cord; and
   II) less than any other portion of the convoluted stretch hose body's outside diameter;
C) the extended length is at least twice the retracted length.

11. The reinforced convoluted hose of claim 10, wherein:
a) the valley portion and the ridge portion are both helical in shape; and
b) in a longitudinal cross section of the convoluted stretch hose body, the ridge portion comprises a plurality of peaks, and the valley portion comprises a plurality of troughs;
c) maintaining the valley portion's radial position comprises, for each trough from the plurality of troughs having two neighboring peaks from the plurality of peaks, maintaining that trough at a position on the convoluted stretch hose body where the bottom of that trough is equidistant from the tops of each of its neighboring peaks.

12. The reinforced convoluted hose of claim 10, wherein:
a) the outside diameter of the valley portion of the convoluted stretch hose body is substantially equal to the inside diameter of the valley reinforcement cord; and
b) the inside diameter of the ridge portion of the convoluted stretch hose body is substantially equal to the outside diameter of the biasing spring.

13. A method of using an extendable reinforced convoluted pressure hose, the method comprising:
a) extending the reinforced convoluted pressure hose from a retracted length to an extended length by pressurizing the convoluted pressure hose;
b) while the reinforced convoluted pressure hose is at the extended length, using it to transport a fluid from a fluid source at a first end of the reinforced convoluted pressure hose to a second end of the reinforced convoluted pressure hose from which it is discharged;
c) after using the reinforced convoluted pressure hose to transport the fluid, allowing the reinforced convoluted pressure hose to self-retract while maintaining a convoluted shape by:
   i) depressurizing the convoluted pressure hose such that a natural tendency of a metal biasing spring adapted to support a ridge portion of the reinforced convoluted pressure hose at both the extended length and the refracted length returns the reinforced convoluted pressure hose from the extended length to the retracted length; and
   ii) stabilizing a valley portion of the of the reinforced convoluted pressure hose with a valley reinforcement cord which is disposed along the valley portion of the reinforced convoluted pressure hose and is adapted to maintain the valley portion's radial position at the extended length;

wherein the extended length is at least twice the retracted length.

14. The method of claim 13, wherein:
a) the valley portion and the ridge portion are both helical in shape; and
b) in a longitudinal cross section of the reinforced convoluted pressure hose, the ridge portion comprises a plurality of peaks, and the valley portion comprises a plurality of troughs;
c) maintaining the valley portion's radial position comprises, for each trough from the plurality of troughs having two neighboring peaks from the plurality of peaks, maintaining that trough at a position where the bottom of that trough is equidistant from the tops of each of its neighboring peaks.

15. The method of claim 13, wherein the reinforced convoluted pressure hose comprises a convoluted stretch hose body between the valley reinforcement cord and the biasing spring, with the biasing spring disposed on the stretch hose body's interior, and the valley reinforcement cord disposed on the stretch hose body's exterior.

* * * * *